(12) United States Patent
Akinsanya et al.

(10) Patent No.: US 11,970,135 B2
(45) Date of Patent: *Apr. 30, 2024

(54) METHODS FOR SHARED VEHICLE ACCESS

(71) Applicant: Geotab Inc., Oakville (CA)

(72) Inventors: Mobaderin Akinsanya, Toronto (CA); Bruno Gomez de Oliveira, Lake Country (CA); Paul Ayooluwa Soladoye, Kitchener (CA); Matthew Frederick Snow, Kitchener (CA); Gabriel Francklin Yano de Sousa, Waterloo (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,262

(22) Filed: Jul. 14, 2023

(65) Prior Publication Data
US 2024/0067126 A1 Feb. 29, 2024

Related U.S. Application Data

(63) Continuation of application No. 17/988,247, filed on Nov. 16, 2022, now Pat. No. 11,814,010.

(60) Provisional application No. 63/401,807, filed on Aug. 29, 2022.

(51) Int. Cl.
*B60R 25/24* (2013.01)
*B60R 25/01* (2013.01)
*G06Q 10/02* (2012.01)

(52) U.S. Cl.
CPC ............ *B60R 25/241* (2013.01); *B60R 25/01* (2013.01); *G06Q 10/02* (2013.01)

(58) Field of Classification Search
CPC ........ B60R 25/241; B60R 25/01; G06Q 10/02
See application file for complete search history.

(56) References Cited

U.S. PATENT DOCUMENTS

| 8,768,565 | B2 | 7/2014 | Jefferies |
| 9,442,888 | B2 | 9/2016 | Stanfield |
| 9,807,547 | B1 | 10/2017 | Oesterling |
| 9,818,151 | B2 | 11/2017 | Ehrman |
| 9,845,071 | B1 * | 12/2017 | Krishnan ............. G07C 9/0069 |

(Continued)

FOREIGN PATENT DOCUMENTS

EP    3471067 A1    4/2019

OTHER PUBLICATIONS

Extended European Search Report for European Application No. 23190718.9, mailed Feb. 7, 11 pages.

*Primary Examiner* — Thomas D Alunkal
(74) *Attorney, Agent, or Firm* — Mark J. Pringle-Rigby

(57) ABSTRACT

The present systems, devices, and methods relate to managing shared vehicle access. Authorization policies are stored at a network device, and are provided to vehicle devices. Authorization policies each include an authentication scheme, a list of permitted vehicle operations, and a list of requirements to perform vehicle operations. In this way, whether even if a user is authenticated to access a vehicle, vehicle access is controlled based one whether the user is permitted to perform vehicle operations, and whether requirements are met to perform vehicle operations. This provides a flexible and roust vehicle access system. Authorization Policies are distributed to vehicle device in an Access Configuration, which can be updated.

15 Claims, 19 Drawing Sheets

(56) References Cited

U.S. PATENT DOCUMENTS

| | | | |
|---|---|---|---|
| 10,106,172 B2 | 10/2018 | Wingfield | |
| 11,447,097 B1* | 9/2022 | Flick | B60R 16/0231 |
| 11,787,366 B1 | 10/2023 | Akinsanya et al. | |
| 11,814,010 B1* | 11/2023 | Akinsanya | B60R 25/241 |
| 2008/0219274 A1* | 9/2008 | Kato | H04L 12/4625 |
| | | | 370/401 |
| 2011/0112969 A1 | 5/2011 | Zaid | |
| 2011/0264304 A1* | 10/2011 | Burzio | B60R 25/04 |
| | | | 701/2 |
| 2013/0338883 A1 | 12/2013 | Savoure | |
| 2017/0178035 A1 | 6/2017 | Grimm | |
| 2017/0186251 A1* | 6/2017 | Lee | G07C 9/00571 |
| 2017/0308817 A1 | 10/2017 | Miller | |
| 2017/0316535 A1 | 11/2017 | Hirose | |
| 2018/0047220 A1 | 2/2018 | Savoure | |
| 2018/0262891 A1* | 9/2018 | Wu | H04W 12/065 |
| 2018/0326947 A1* | 11/2018 | Oesterling | B60R 25/241 |
| 2019/0001926 A1 | 1/2019 | Arakawa | |
| 2019/0092279 A1 | 3/2019 | Jarvis | |
| 2019/0109855 A1 | 4/2019 | Takeuchi | |
| 2019/0156605 A1 | 5/2019 | Tang | |
| 2020/0026986 A1 | 1/2020 | Ha | |
| 2020/0099522 A1* | 3/2020 | Yang | H04L 9/3226 |
| 2020/0226275 A1* | 7/2020 | Schreiner | G06F 21/6218 |
| 2020/0269861 A1* | 8/2020 | Liffman | B60W 50/14 |
| 2021/0166303 A1* | 6/2021 | Gideon, III | H04L 67/306 |
| 2021/0314336 A1 | 10/2021 | Kishikawa | |
| 2022/0043924 A1* | 2/2022 | Hu | H04L 63/0876 |

\* cited by examiner

METHODS FOR SHARED VEHICLE ACCESS

PRIOR APPLICATION DATA

This application is a continuation of U.S. Non-Provisional patent application Ser. No. 17/988,247 titled "Devices for Shared Vehicle Access", filed on Nov. 16, 2022, which in turn claims priority to U.S. Provisional Patent Application No. 63/401,807 titled "Systems, Devices, and Methods for Shared Vehicle Access", filed on Aug. 29, 2022, the entirety of which is incorporated by reference herein.

TECHNICAL FIELD

The present disclosure generally relates to systems, devices, and methods for managing shared vehicles, and in particular relates to controlling access to shared vehicles.

BACKGROUND

In many scenarios, it is desirable for a vehicle or plurality of vehicles to be shared between different users. As one example, a commercial vehicle fleet may include a plurality of vehicles which are operated by rotating drivers. As another example, a vehicle rental agency may have a plurality of vehicles, which are rented out to different users. To provide vehicle access to different users, it is desirable to have systems, devices, or methods for assigning, identifying, or checking vehicle access privileges of candidate users in order to provide or deny vehicle access appropriately.

SUMMARY

According to a broad aspect, the present disclosure describes a method for managing access to a vehicle including a vehicle device, the method comprising: storing, by at least one non-transitory processor-readable storage medium of the vehicle device, a first authorization policy, the first authorization policy including: a first authentication scheme for authenticating a first access key to use the vehicle in accordance with the first authorization policy; an indication of at least one first vehicle operation which is permitted under the first authorization policy; and an indication of at least one first vehicle access requirement to perform each of the at least one first vehicle operation permitted under the first authorization policy; receiving, by the vehicle device, a user-provided access key from a user; attempting to authenticate access to the vehicle under the first authorization policy, by the vehicle device, by attempting to authenticate the user-provided access key against the first access key in accordance with the first authentication scheme; if attempting to authenticate access to the vehicle under the first authorization policy is successful: receiving, by the vehicle device, a user request to perform a user-requested vehicle operation; determining, by the vehicle device, whether the user-requested vehicle operation is included in the at least one first vehicle operation which is permitted under the first authorization policy; determining, by the vehicle device, whether a respective at least one first vehicle access requirement to perform the user-requested vehicle operation is met; if the user-requested vehicle operation is included in the at least one first vehicle operation which is permitted under the first authorization policy, and the respective at least one first vehicle access requirement to perform the user-requested vehicle operation is met, performing the user-requested vehicle operation; and if the user-requested vehicle operation is not included in the at least one first vehicle operation which is permitted under the first authorization policy, or the respective at least one first vehicle access requirement to perform the user-requested vehicle operation is not met, denying the user request to perform the user-requested vehicle operation; and if attempting to authenticate access to the vehicle under the first authorization policy is not successful: denying access to the vehicle to the user under the first authorization policy.

The method may further comprise: storing, by the at least one non-transitory processor-readable storage medium of the vehicle device, a second authorization policy different from the first authorization policy, the second authorization policy including: a second authentication scheme for authenticating a second access key to use the vehicle in accordance with the second authorization policy; an indication of at least one second vehicle operation which is permitted under the second authorization policy; and an indication of at least one second vehicle access requirement to perform each of the at least one second vehicle operation permitted under the second authorization policy. The method may further comprise, if attempting to authenticate access to the vehicle under the first authorization policy is not successful: attempting to authenticate access to the vehicle under the second authorization policy, by the vehicle device, by attempting to authenticate the user-provided access key to the second access key in accordance with the second authentication scheme; if attempting to authenticate access to the vehicle under the second authorization policy is successful: receiving, by the vehicle device, the user request to perform the user-requested vehicle operation; determining, by the vehicle device, whether the user-requested vehicle operation is included in the at least one second vehicle operation which is permitted under the second authorization policy; determining, by the vehicle device, whether a respective at least one second vehicle access requirement to perform the user-requested vehicle operation is met; if the user-requested vehicle operation is included in the at least one second vehicle operation which is permitted under the second authorization policy, and the respective at least one second vehicle access requirement to perform the user-requested vehicle operation is met, performing the user-requested vehicle operation; and if the user-requested vehicle operation is not included in the at least one second vehicle operation which is permitted under the second authorization policy, or the respective at least one second vehicle access requirement to perform the user-requested vehicle operation is not met, denying the user request to perform the user-requested vehicle operation; and if attempting to authenticate access to the vehicle under the second authorization policy is not successful: denying access to the vehicle to the user under the second authorization policy.

The method may further comprise: storing, by the at least one non-transitory processor-readable storage medium of the vehicle device, at least one additional authorization policy different from the first authorization policy and the second authorization policy, each authorization policy in the at least one additional authorization policy including: a respective authentication scheme for authenticating a respective access key to use the vehicle in accordance with the additional authorization policy; an indication of at least one respective vehicle operation which is permitted under the additional authorization policy; and an indication of at least one respective vehicle access requirement to perform each of the at least one respective vehicle operation permitted under the additional authorization policy. The method may further comprise: if attempting to authenticate access to the vehicle under the first authorization policy, and attempting to authenticate access to the vehicle under the second authorization policy, are not successful: attempting to authenticate access to the vehicle under the at least one additional authorization policy, by the vehicle device, by attempting to authenticate the user-provided access key to the respective access key in accordance with the respective authentication scheme of the at least one additional authorization policy; if attempting to authenticate access to the vehicle under the at least one additional authorization policy is successful: receiving, by the vehicle device, the user request to perform the user-requested vehicle operation; determining, by the vehicle device, whether the user-requested vehicle operation is included in the at least one respective vehicle operation which is permitted under the at least one additional authorization policy; determining, by the vehicle device, whether a respective at least one vehicle access requirement to perform the user-requested vehicle operation is met; if the user-requested vehicle operation is included in the at least one respective vehicle operation which is permitted under the at least one additional authorization policy, and the respective at least one vehicle access requirement to perform the user-requested vehicle operation is met, performing the user-requested vehicle operation; and if the user-requested vehicle operation is not included in the at least one respective vehicle operation which is permitted under the at least one additional authorization policy, or the respective at least one vehicle access requirement to perform the user-requested vehicle operation is not met, denying the user request to perform the user-requested vehicle operation; and if attempting to authenticate access to the vehicle under the at least one additional authorization policy is not successful: denying access to the vehicle to the user under the at least one additional authorization policy.

The method may further comprise: storing, by the at least one non-transitory processor-readable storage medium of the vehicle device, at least one additional authorization policy different from the first authorization policy, each authorization policy in the at least one additional authorization policy including: a respective authentication scheme for authenticating a respective access key to use the vehicle in accordance with the additional authorization policy; an indication of at least one respective vehicle operation which is permitted under the additional authorization policy; and an indication of at least one respective vehicle access requirement to perform each of the at least one respective vehicle operation permitted under the additional authorization policy; and prior to attempting to authenticate access to the vehicle under the first authorization policy, selecting the first authorization policy for authentication from the first authorization policy and the at least one additional authorization policy.

The at least one first vehicle operation which is permitted under the first authorization policy may include at least one vehicle operation selected from a group of vehicle operations consisting of: unlocking at least one door of the vehicle; locking at least one door of the vehicle; unlocking a service access of the vehicle; locking a service access of the vehicle; enabling an ignition of the vehicle; disabling an ignition of the vehicle; starting an engine of the vehicle; turning off an engine of the vehicle; enabling movement of the vehicle; disabling movement of the vehicle; disengaging a parking brake of the vehicle; engaging the parking brake of the vehicle; providing an indication of a location of the vehicle; providing an indication of a location of a device in the vehicle; activating at least one light of the vehicle; activating a horn of the vehicle; and reversing authentication of the user for the vehicle.

The at least one first vehicle access requirement to perform each of the at least one first vehicle operation permitted under the first authorization policy may include at least one vehicle access requirement selected from a group of vehicle access requirements consisting of: the vehicle being vacant; the vehicle not being reserved for use by another user; the vehicle being reserved for use by the user; and the vehicle being operable.

Receiving a user request to perform a user-requested vehicle operation may comprise: receiving an indication of an attempt by the user to perform the user-requested vehicle operation.

The method may further comprise storing, by the at least one non-transitory processor-readable storage medium, an indication of at least one reservation of the vehicle.

The method may further comprise storing, by the at least one non-transitory processor-readable storage medium, a reservation schedule of the vehicle.

The method may further comprise: receiving, by the vehicle device, an identification of a user who provides the user-provided access key to the vehicle device. The method may further comprise: storing, by the at least one non-transitory processor-readable storage medium, a list of at least one user who can be authenticated to access the vehicle; and attempting to authenticate access to the vehicle under the first authorization policy may further comprise: attempting to authenticate, by the vehicle device, the identification of the user to the list of at least one user who can be authenticated to access the vehicle. The method may further comprise: sending, by at least one communication interface of the vehicle device, a status message to be received by at least one remote device remote from the vehicle, the status message indicative of at least a version of the first authorization policy or of the list of at least one user who can be authenticated to access the vehicle. The method may further comprise receiving, by the at least one communication interface of the vehicle device, an updated version of the first authorization policy or an updated list of at least one user who can be authenticated to access the vehicle after sending the status message. Sending the status message may be performed in response to receiving a query for status. Sending the status message may comprise sending the status message on a periodic basis.

According to another broad aspect, the present disclosure descries a vehicle device for managing access to a vehicle, the vehicle device positioned at the vehicle and comprising: at least one processor; and at least one non-transitory processor-readable storage medium communicatively coupled to the at least one processor, wherein the at least one non-transitory processor-readable storage medium stores a first authorization policy including: a first authentication scheme for authenticating a first access key to use the vehicle in accordance with the first authorization policy; an indication of at least one first vehicle operation which is permitted under the first authorization policy; and an indication of at least one first vehicle access requirement to perform each of the at least one first vehicle operation permitted under the first authorization policy, further wherein the at least one non-transitory processor-readable storage medium stores processor-executable instructions which, when executed by the at least one processor, cause the vehicle device to: receive a user-provided access key from a user; attempt to authenticate access to the vehicle under the first authorization policy, by the at least one processor, by attempting to authenticate the user-provided access key against the first access key in accordance with the first authentication scheme; if attempting to authenticate access to the vehicle under the first authorization policy is successful: receive a user request to perform a user-requested vehicle operation; determine, by the at least one processor, whether the user-requested vehicle operation is included in the at least one first vehicle operation which is permitted under the first authorization policy; determine, by the at least one processor, whether a respective at least one first vehicle access requirement to perform the user-requested vehicle operation is met; if the user-requested vehicle operation is included in the at least one first vehicle operation which is permitted under the first authorization policy, and the respective at least one first vehicle access requirement to perform the user-requested vehicle operation is met, allow the vehicle to perform the user-requested vehicle operation; and if the user-requested vehicle operation is not included in the at least one first vehicle operation which is permitted under the first authorization policy, or the respective at least one first vehicle access requirement to perform the user-requested vehicle operation is not met, deny the user request to perform the user-requested vehicle operation; and if attempting to authenticate access to the vehicle under the first authorization policy is not successful: deny access to the vehicle to the user under the first authorization policy.

The at least one non-transitory processor-readable storage medium may further store a second authorization policy different from the first authorization policy, the second authorization policy including: a second authentication scheme for authenticating a second access key to use the vehicle in accordance with the second authorization policy; an indication of at least one second vehicle operation which is permitted under the second authorization policy; and an indication of at least one second vehicle access requirement to perform each of the at least one second vehicle operation permitted under the second authorization policy. If attempting to authenticate access to the vehicle under the first authorization policy is not successful, the processor-executable instructions when executed may further cause the vehicle device to: attempt to authenticate access to the vehicle under the second authorization policy, by the at least one processor, by attempting to authenticate the user-provided access key to the second access key in accordance with the second authentication scheme; if attempting to authenticate access to the vehicle under the second authorization policy is successful, the processor-executable instructions may further cause the vehicle device to: receive the user request to perform the user-requested vehicle operation; determine, by the at least one processor, whether the user-requested vehicle operation is included in the at least one second vehicle operation which is permitted under the second authorization policy; determine, by the at least one processor, whether a respective at least one second vehicle access requirement to perform the user-requested vehicle operation is met; if the user-requested vehicle operation is included in the at least one second vehicle operation which is permitted under the second authorization policy, and the respective at least one second vehicle access requirement to perform the user-requested vehicle operation is met, allow the vehicle to perform the user-requested vehicle operation; and if the user-requested vehicle operation is not included in the at least one second vehicle operation which is permitted under the second authorization policy, or the respective at least one second vehicle access requirement to perform the user-requested vehicle operation is not met, deny the user request to perform the user-requested vehicle operation. If attempting to authenticate access to the vehicle under the second authorization policy is not successful: the processor-executable instructions may further cause the system to deny access to the vehicle to the user under the second authorization policy.

The at least one non-transitory processor-readable storage medium may further store at least one additional authorization policy different from the first authorization policy and the second authorization policy, each authorization policy in the at least one additional authorization policy including: a respective authentication scheme for authenticating a respective access key to use the vehicle in accordance with the additional authorization policy; an indication of at least one respective vehicle operation which is permitted under the additional authorization policy; and an indication of at least one respective vehicle access requirement to perform each of the at least one respective vehicle operation permitted under the additional authorization policy. If attempting to authenticate access to the vehicle under the first authorization policy, and attempting to authenticate access to the vehicle under the second authorization policy, are not successful, the processor-executable instructions may cause the vehicle device to: attempt to authenticate access to the vehicle under the at least one additional authorization policy, by the at least one processor, by attempting to authenticate the user-provided access key to the respective access key in accordance with the respective authentication scheme of the at least one additional authorization policy; if attempting to authenticate access to the vehicle under the at least one additional authorization policy is successful: receive, by the vehicle device, the user request to perform the user-requested vehicle operation; determine, by the at least one processor, whether the user-requested vehicle operation is included in the at least one respective vehicle operation which is permitted under the at least one additional authorization policy; determine, by the at least one processor, whether a respective at least one vehicle access requirement to perform the user-requested vehicle operation is met; if the user-requested vehicle operation is included in the at least one respective vehicle operation which is permitted under the at least one additional authorization policy, and the respective at least one vehicle access requirement to perform the user-requested vehicle operation is met, allow the vehicle to perform the user-requested vehicle operation; and if the user-requested vehicle operation is not included in the at least one respective vehicle operation which is permitted under the at least one additional authorization policy, or the respective at least one vehicle access requirement to perform the user-requested vehicle operation is not met, deny the user request to perform the user-requested vehicle operation. If attempting to authenticate access to the vehicle under the at least one additional authorization policy is not successful: the processor-executable instructions may further cause the system to deny access the vehicle to the user under the at least one additional authorization policy.

The at least one non-transitory processor-readable storage medium may further store at least one additional authorization policy different from the first authorization policy, each authorization policy in the at least one additional authorization policy including: a respective authentication scheme for authenticating a respective access key to use the vehicle in accordance with the additional authorization policy; an indication of at least one respective vehicle operation which is permitted under the additional authorization policy; and an indication of at least one respective vehicle access requirement to perform each of the at least one respective vehicle operation permitted under the additional authorization policy, further wherein the processor-executable instructions may cause the vehicle device to: prior to attempting to authenticate access to the vehicle under the first authorization policy, select the first authorization policy for authentication from the first authorization policy and the at least one additional authorization policy.

The at least one first vehicle operation which is permitted under the first authorization policy may include at least one vehicle operation selected from a group of vehicle operations consisting of: unlocking at least one door of the vehicle; locking at least one door of the vehicle; unlocking a service access of the vehicle; locking a service access of the vehicle; enabling an ignition of the vehicle; disabling an ignition of the vehicle; starting an engine of the vehicle; turning off an engine of the vehicle; enabling movement of the vehicle; disabling movement of the vehicle; disengaging a parking brake of the vehicle; engaging the parking brake of the vehicle; providing an indication of a location of the vehicle; providing an indication of a location of a device in the vehicle; activating at least one light of the vehicle; activating a horn of the vehicle; and reversing authentication of the user for the vehicle.

The at least one first vehicle access requirement to perform each of the at least one first vehicle operation permitted under the first authorization policy may include at least one vehicle access requirement selected from a group of vehicle access requirements consisting of: the vehicle being vacant; the vehicle not being reserved for use by another user; the vehicle being reserved for use by the user; and the vehicle being operable.

The user request to perform a user-requested vehicle operation may comprise an indication of an attempt by the user to perform the user-requested vehicle operation.

The at least one non-transitory processor-readable storage medium may further store an indication of at least one reservation of the vehicle.

The at least one non-transitory processor-readable storage medium may further store a reservation schedule of the vehicle.

The processor-executable instructions may further cause the vehicle device to receive an identification of a user who provides the user-provided access key to the vehicle device. The at least one non-transitory processor-readable storage medium may further store a list of at least one user who can be authenticated to access the vehicle; and the processor-executable instructions which cause the vehicle device to attempt to authenticate access to the vehicle under the first authorization policy may cause the vehicle device to: attempt to authenticate, by the at least one processor, the identification of the user to the list of at least one user who can be authenticated to access the vehicle. The processor-executable instructions may further cause the vehicle device to: send, by at least one communication interface of the vehicle device, a status message to be received by at least one network device remote from the vehicle, the status message indicative of at least a version of the first authorization policy or of the list of at least one user who can be authenticated to access the vehicle. The processor-executable instructions may further cause the vehicle device to receive, by the at least one communication interface of the vehicle device, an updated version of the first authorization policy or an updated list of at least one user who can be authenticated to access the vehicle after sending the status message. The processor-executable instructions may cause the at least one communication interface of the vehicle device to send the status message in response to receiving a query for status. The processor-executable instructions may cause the at least one communication interface of the vehicle device to send the status message on a periodic basis.

According to yet another broad aspect, the present disclosure describes a method for managing access to a plurality of vehicles, where each vehicle of the plurality of vehicles includes a respective vehicle device capable of communication with at least one network device, the method comprising: storing, by at least one non-transitory processor-readable storage medium of the at least one network device, an access configuration which specifies at least one authorization policy, each authorization policy including: a respective authentication scheme for authenticating an access key to access a vehicle in accordance with the authorization policy; a respective indication of at least one vehicle operation which is permitted under the authorization policy; and a respective indication of at least one vehicle access requirement to perform each of the at least one vehicle operation permitted under the authorization policy; sending, by at least one communication interface of the at least one network device, the access configuration, to be stored on a non-transitory processor-readable storage medium of a first vehicle device included in a first vehicle of the plurality of vehicles; and controlling access to the first vehicle, by the first vehicle device, based on the at least one authorization policy of the access configuration stored on the non-transitory processor-readable storage medium of the first vehicle device.

The method may further comprise: receiving, by the at least one communication interface of the at least one network device, a first status message from the first vehicle device, the first status message indicating an access configuration stored on the non-transitory processor-readable storage medium of the first vehicle device; determining, by at least one processor of the at least one network device, whether there is a mismatch between the access configuration indicated in the first status message and the access configuration stored at the at least one non-transitory processor-readable storage medium of the at least one network device; and if there is a mismatch between the access configuration indicated in the first status message and the access configuration stored at the at least one non-transitory processor-readable storage medium of the at least one network device, sending, by the at least one communication interface of the at least one network device, the access configuration stored at the at least one non-transitory processor-readable storage medium of the at least one network device, to be stored on the non-transitory processor-readable storage medium of the first vehicle device. The method may further comprise sending, by the at least one communication interface of the at least one network device, a first query to be received by the first vehicle device, the first query requesting the first status message. Receiving the first status message from the first vehicle device may occur after sending the first query. The method may further comprise after storing, by the at least one non-transitory processor-readable storage medium of the at least one network device, at least one access configuration which specifies at least one authorization policy, and before determining whether there is a mismatch: storing, by the at least one non-transitory processor-readable storage medium of the at least one network device, an updated access configuration, which replaces the previously stored access configuration.

The method may further comprise: storing, by the at least one non-transitory processor-readable storage medium of the at least one network device, an updated access configuration; and in response to storing the updated access configuration, sending, by the at least one communication interface of the at least one network device, the updated access configuration, to be stored on the non-transitory processor-readable storage medium of the first vehicle device.

The updated access configuration may include at least one updated authorization policy, and the at least one updated authorization policy may include at least one update selected from a group of updates consisting of: an updated respective authentication scheme; an updated respective indication of at least one vehicle operation which is permitted; and a respective updated indication of at least one vehicle access requirement. The previously stored access configuration may further include a list of at least one user authorized to access vehicles in the plurality of vehicles, and the updated access configuration may include an updated list of at least one user authorized to access vehicles in the plurality of vehicles.

The method may further comprise: determining whether a confirmation message is received from the first vehicle device confirming that the access configuration as sent was received by the first vehicle device; and if the confirmation message is not received, schedule resending of the access configuration to be received by the first vehicle device.

The method may further comprise sending, by the at least one communication interface of the at least one network device, the access configuration, to be stored on a respective non-transitory processor-readable storage medium of each respective vehicle device included in each other vehicle of the plurality of vehicles in addition to the first vehicle. The method may further comprising controlling access to each other vehicle of the plurality of vehicles in addition to the first vehicle, by the respective vehicle device included in each vehicle of the plurality of vehicles, based on the at least one authorization policy stored on the respective non-transitory processor-readable storage medium of each respective vehicle device. The method may further comprise: storing, by the at least one non-transitory processor-readable storage medium of the at least one network device, an updated access configuration; and in response to storing the updated access configuration, sending, by the at least one communication interface of the at least one network device, the updated access configuration, to be stored on the respective non-transitory processor-readable storage medium of each respective vehicle device of each vehicle of the plurality of vehicles. The method may further comprise: receiving, by the at least one communication interface of the at least one network device, a respective status message from each vehicle device, each respective status message indicating an access configuration stored on the non-transitory processor-readable storage medium of the respective vehicle device from which the respective status message originates; determining, by at least one processor of the at least one network device, whether there is a mismatch between the access configuration indicated in each status message and the access configuration stored at the at least one non-transitory processor-readable storage medium of the at least one network device; and for any status message where there is a mismatch between the access configuration indicated in the respective status message and the access configuration stored at the at least one non-transitory processor-readable storage medium of the at least one network device, sending, by the at least one communication interface of the at least one network device, the access configuration stored at the at least one non-transitory processor-readable storage medium of the at least one network device, to be stored on the non-transitory processor-readable storage medium of each respective vehicle device from which the respective status messages for which there is a mismatch originate.

According to yet another broad aspect, the present disclosure describes a system for managing access to a plurality of vehicles where each vehicle of the plurality of vehicles includes a respective vehicle device, the system comprising: at least one communication interface; at least one processor; and at least one non-transitory processor-readable storage medium communicatively coupled to the at least one processor, the at least one non-transitory processor-readable storage medium storing an access configuration which specifies at least one authorization policy, each authorization policy including: a respective authentication scheme for authenticating an access key to access a vehicle in accordance with the authorization policy; a respective indication of at least one vehicle operation which is permitted under the authorization policy; and a respective indication of at least one vehicle access requirement to perform each of the at least one vehicle operation permitted under the authorization policy; wherein the at least one non-transitory processor-readable storage medium further stores processor-executable instructions which when executed by the at least one processor cause the system to: send, by the at least one communication interface, the access configuration to be stored at a first vehicle device included in a first vehicle of the plurality of vehicles; receive, by the at least one communication interface, a first status message from the first vehicle device, the first status message indicating an access configuration stored at the first vehicle device; determine, by at least one processor, whether there is a mismatch between the access configuration indicated in the first status message and the access configuration stored at the at least one non-transitory processor-readable storage medium; and if there is a mismatch between the access configuration indicated in the first status message and the access configuration stored at the at least one non-transitory processor-readable storage medium, send, by the at least one communication interface, the access configuration stored at the at least one non-transitory processor-readable storage medium, to be stored at the first vehicle device.

The processor-executable instructions may cause the system to send, by the at least one communication interface, a first query to be received by the first vehicle device, the first query requesting the first status message, and the first status message is received from the first vehicle device after the first query is sent.

After storing the access configuration which specifies the at least one authorization policy, and before determining whether there is a mismatch, the processor-executable instructions may further cause the system to: store, by the at least one non-transitory processor-readable storage medium, an updated access configuration, which replaces the previously stored access configuration.

The processor-executable instructions may further cause the system to: determine whether a confirmation message is received from the first vehicle device confirming that the sent access configuration was received by the first vehicle device; and if the confirmation message is not received, schedule resending of the access configuration to be received by the first vehicle device.

The processor-executable instructions may further cause the system to send, by the at least one communication interface, the access configuration, to be stored on a respective non-transitory processor-readable storage medium of each respective vehicle device included in each other vehicle of the plurality of vehicles in addition to the first vehicle. The processor-executable instructions may further cause the system to: receive, by the at least one communication interface, a respective status message from each vehicle device, each respective status message indicating an access configuration stored at the respective vehicle device from which the respective status message originates; determine, by at least one processor, whether there is a mismatch between the access configuration indicated in each status message and the access configuration stored at the at least one non-transitory processor-readable storage medium; and for any status message where there is a mismatch between the access configuration indicated in the respective status message and the access configuration stored at the at least one non-transitory processor-readable storage medium, send, by the at least one communication interface, the access configuration stored at the at least one non-transitory processor-readable storage medium, to be stored at each respective vehicle device from which the respective status messages for which there is a mismatch originate. The system may further comprise each vehicle device included in a vehicle of the plurality of vehicles, each vehicle device including: at least one vehicle device processor; and at least one vehicle device non-transitory processor-readable storage medium having processor-executable instructions stored thereon which when executed by the at least one vehicle device processor cause the respective vehicle device to: control access to the respective vehicle, based on the at least one authorization policy stored at the respective vehicle device.

The system may further comprise the first vehicle device, the first vehicle device including: at least one first processor; and at least one first non-transitory processor-readable storage medium having processor-executable instructions stored thereon which when executed by the at least one first processor cause the first vehicle device to: control access to the first vehicle, based on the at least one authorization policy stored at the first vehicle device.

According to yet another broad aspect, the present disclosure describes a system for managing access to a plurality of vehicles where each vehicle of the plurality of vehicles includes a respective vehicle device, the system comprising: at least one communication interface; at least one processor; and at least one non-transitory processor-readable storage medium communicatively coupled to the at least one processor, the at least one non-transitory processor-readable storage medium storing an access configuration which specifies at least one authorization policy, each authorization policy including: a respective authentication scheme for authenticating an access key to access a vehicle in accordance with the authorization policy; a respective indication of at least one vehicle operation which is permitted under the authorization policy; and a respective indication of at least one vehicle access requirement to perform each of the at least one vehicle operation permitted under the authorization policy; wherein the at least one non-transitory processor-readable storage medium further stores processor-executable instructions which when executed by the at least one processor cause the system to: send, by the at least one communication interface, the access configuration to be stored at a first vehicle device included in a first vehicle of the plurality of vehicles; store, by the at least one non-transitory processor-readable storage medium, an updated access configuration; and in response to storing the updated access configuration, send, by the at least one communication interface, the updated access configuration, to be stored at the first vehicle device.

The updated access configuration may include at least one updated authorization policy, and the at least one updated authorization policy may include at least one update selected from a group of updates consisting of: an updated respective authentication scheme; an updated respective indication of at least one vehicle operation which is permitted; and a respective updated indication of at least one vehicle access requirement.

The previously stored access configuration may further include a list of at least one user authorized to access vehicles in the plurality of vehicles, and the updated access configuration may include an updated list of at least one user authorized to access vehicles in the plurality of vehicles.

The processor-executable instructions may further cause the system to: determine, by the at least one processor, whether a confirmation message is received from the first vehicle device confirming that the sent access configuration was received by the first vehicle device; and if the confirmation message is not received, schedule resending of the access configuration to be received by the first vehicle device.

The processor-executable instructions may further cause the system to send, by the at least one communication interface, the access configuration to be stored on a respective non-transitory processor-readable storage medium of each respective vehicle device included in each other vehicle of the plurality of vehicles in addition to the first vehicle. The processor-executable instructions may further cause the system to: store, by the at least one non-transitory processor-readable storage medium, an updated access configuration; and in response to storing the updated access configuration, send, by the at least one communication interface, the updated access configuration to be stored on a respective non-transitory processor-readable storage medium of each respective vehicle device of each vehicle of the plurality of vehicles. The system may further comprise each vehicle device included in a vehicle of the plurality of vehicles, and each vehicle device may include: at least one vehicle device processor; and at least one vehicle device non-transitory processor-readable storage medium having processor-executable instructions stored thereon which when executed by the at least one vehicle device processor cause the respective vehicle device to: control access to the respective vehicle, based on the at least one authorization policy stored at the respective vehicle device.

The system may further comprise the first vehicle device, and the first vehicle device may include: at least one first processor; and at least one first non-transitory processor-readable storage medium having processor-executable instructions stored thereon which when executed by the at least one first processor cause the first vehicle device to: control access to the first vehicle, based on the at least one authorization policy stored at the first vehicle device.

BRIEF DESCRIPTION OF THE DRAWINGS

Exemplary non-limiting embodiments are described with reference to the accompanying drawings in which.

DETAILED DESCRIPTION

The present disclosure details systems, methods, and devices for managing access to shared vehicles.

Authorization policies are used to control vehicle access to users, by allowing or restricting users from perform vehicle operations, based on authentication, permitted vehicle operations, and restrictions on what operations can be performed. A vehicle operation is allowed to be performed when a user is authenticated, when the vehicle operation is permitted for the user, and when all requirements to perform the vehicle operation are met. As examples, authentication entails determining whether the user has an appropriate access key for accessing the vehicle (e.g. an authentic or legitimate access key); "permitted vehicle operations" refers to operations which an authenticated user is allowed to perform (it is not always appropriate to give an authenticated user full vehicle access); "requirements" refers to conditions which need to be met in order for permitted operations to be performed (e.g. to avoid access conflicts between multiple users).

Figure 1:
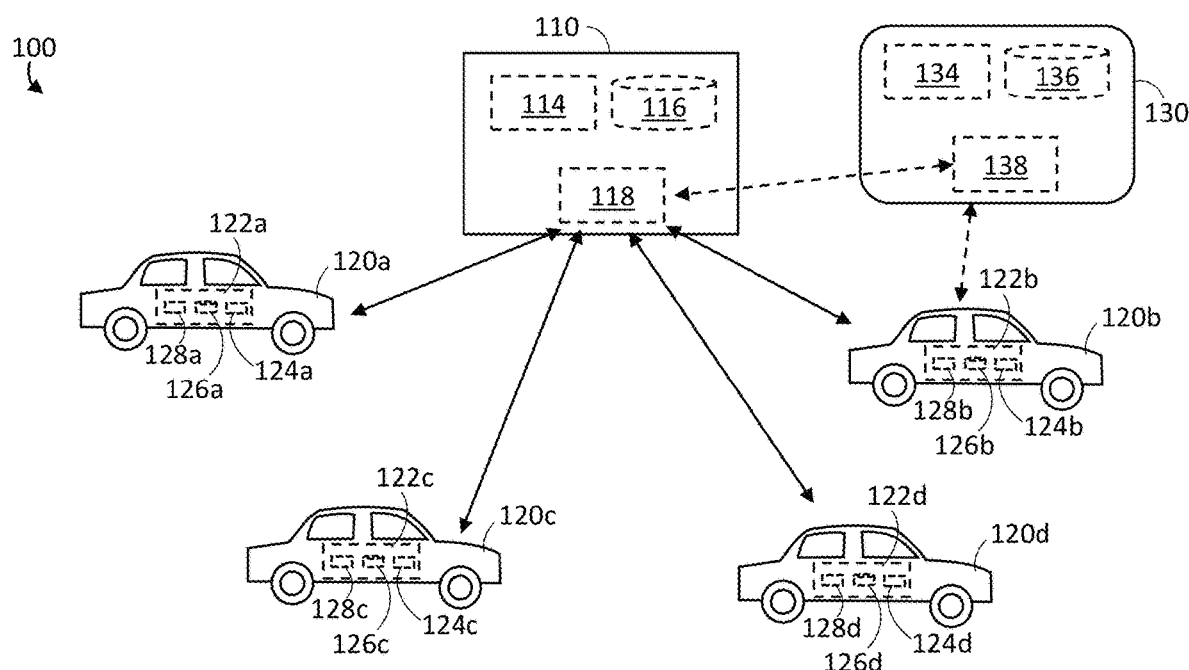
FIG. 1 is a schematic view of a system for managing shared vehicle access.

FIG. 1 is a schematic view of a system 100 for managing shared vehicle access. FIG. 1 shows a network device 110, which includes at least one processor 114, at least one non-transitory processor-readable storage medium 116, and a communication interface 118. Although illustrated as one device, network device 110 can include a plurality of devices, a plurality of processors 114, a plurality of non-transitory processor-readable storage mediums 116, and/or a plurality of communication interfaces 118. In this sense, network device 110 can itself be called a "system". Further, such a plurality of network devices or network system can be in close proximity (e.g. in a central server location), or can be distributed across different locations (e.g. as remote devices). Communication interface 118 can be a wired or wireless interface, through which network device 110 communicates with other devices, such as a plurality of vehicles, vehicle devices, or user devices.

In the illustrated example, network device 110 is shown as communicating with vehicle devices in four vehicles 120*a*, 120*b*, 120*c*, and 120*d* (collectively referred to as vehicles 120). However, network device 110 could communicate with vehicle devices in any appropriate number of vehicles, such as one vehicle, dozens of vehicles, hundreds of vehicles, thousands of vehicles, or even more vehicles.

Vehicle 120*a* includes at least one processor 124*a*, at least one non-transitory processor-readable storage medium 126*a*, and a communication interface 128*a*. Together, the at least one processor 124*a*, the at least one non-transitory processor-readable storage medium 126*a*, and the communication interface 128*a* can be referred to as "vehicle device" 122*a*.

Vehicle 120*b* includes at least one processor 124*b*, at least one non-transitory processor-readable storage medium 126*b*, and a communication interface 128*b*. Together, the at least one processor 124*b*, the at least one non-transitory processor-readable storage medium 126*b*, and the communication interface 128*b* can be referred to as "vehicle device" 122*b*.

Vehicle 120*c* includes at least one processor 124*c*, at least one non-transitory processor-readable storage medium 126*c*, and a communication interface 128*c*. Together, the at least one processor 124*c*, the at least one non-transitory processor-readable storage medium 126*c*, and the communication interface 128*c* can be referred to as "vehicle device" 122*c*.

Vehicle 120*d* includes at least one processor 124*d*, at least one non-transitory processor-readable storage medium 126*d*, and a communication interface 128*d*. Together, the at least one processor 124*d*, the at least one non-transitory processor-readable storage medium 126*d*, and the communication interface 128*d* can be referred to as "vehicle device" 122*d*.

Collectively, vehicle 120*a*, vehicle 120*b*, vehicle 120*c*, and vehicle 120*d* can be referred to as "vehicles 120". Collectively, the at least one processor 124*a*, the at least one processor 124*b*, the at least one processor 124*c*, and the at least one processor 124*d* can be referred to as "processors 124". Collectively, the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d* can be referred to as "non-transitory processor-readable storage mediums 126". Collectively, communication interface 128*a*, communication interface 128*b*, communication interface 128*c*, and communication interface 128*d* can be referred to as "communication interfaces 128". Collectively, vehicle device 122*a*, vehicle device 122*b*, vehicle device 122*c*, and vehicle device 122*d* can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. However, this is not necessarily the case, and each vehicle device 122 can refer to the collection of components installed in a vehicle (i.e. they do not have to be packaged in a single housing). Further, components of any of the vehicle devices 122 can be multi-purpose components which serve other functions within the vehicle.

Each of vehicle devices 122 can control access to a respective vehicle 120, such that a user can gain vehicle access via the vehicle device 122 without needing a physical key (e.g. a bladed ignition key or a vehicle-specific keyfob).

System 100 is also illustrated in FIG. 1 as including an optional user device 130. User device 130 can further optionally include any of at least one processor 134, at least one non-transitory processor-readable storage medium 136, and a communication interface 138. As one example, user device 130 could be a personal device belonging to a user, such as a smartphone, PDA, tablet, or any similar device. As another example, user device 130 could be an identification device such as an RFID card, key fob, or similar. In some implementations, user device 130 communicates with a vehicle device 122 (e.g. via communication interface 138). In FIG. 1, user device 130 is shown as communicating with vehicle device 122*b* in vehicle 120*b*, but user device 130 could also communicate with any of vehicle devices 122*a*, 122*c*, or 122*d* in respective vehicles 120*a*, 120*c*, and 120*d*, or any other vehicle device, as appropriate for a given application. In some implementations, user device 130 communicates with network device 110 (e.g. via communication interfaces 118 and 138) as illustrated in FIG. 1. In some implementations, user device 130 communicates with a vehicle device 122 and with network device 110.

Figure 2:
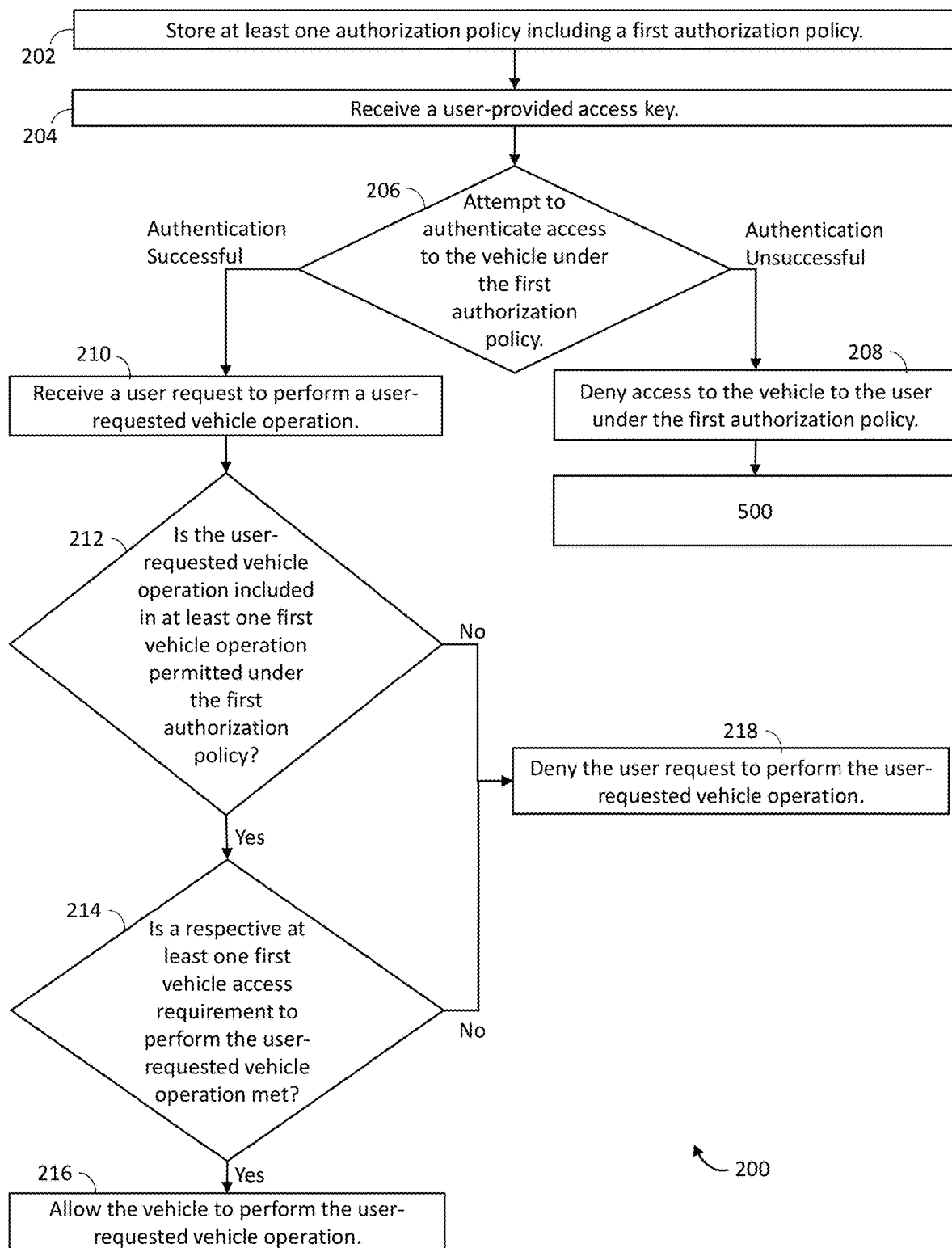
FIG. 2 is a flowchart diagram of a method for managing shared access to a vehicle, in accordance with an exemplary illustrated implementation.

FIG. 2 is a flowchart diagram which illustrates an exemplary method 200 performed by devices such as those in FIG. 1. Method 200 as illustrated includes acts 202, 204, 206, 208, 210, 212, 214, 216 and 218. One skilled in the art will appreciate that additional acts could be added, acts could be removed, or acts could be reordered as appropriate for a given application. With reference to the example illustrated in FIG. 1, acts can be performed by appropriate components of vehicle devices 122. Further, any of the at least one non-transitory processor-readable storage mediums 126 could have instructions stored thereon, which when executed by a respective at least one processor (processors 124) cause the respective vehicle device 122 to perform a given act of method 200. In the discussion of method 200 below, reference to an act being performed by at least one processor 124 refers to the act being performed by any of processors 124*a*, 124*b*, 124*c*, or 124*d*. Reference to an act being performed by at least one non-transitory processor-readable storage medium 126 refers to the act being performed by any of non-transitory processor-readable storage mediums 126*a*, 126*b*, 126*c*, or 126*d*. Reference to an act being performed by communication interface 128 refers to the act being performed by any of communication interfaces 128*a*, 128*b*, 128*c*, or 128*d*. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122*a*, 122*b*, 122*c*, or 122*d* (or any other similar vehicle device). That is, method 200 is described in the context of a "vehicle 120" which includes a "vehicle device 122", which generically refers to any one of vehicles 120*a*, 120*b*, 120*c*, 120*d*, or similar vehicle, including the corresponding vehicle device 122*a*, 122*b*, 122*c*, 122*d*, or similar vehicle device.

At 202, at least one authorization policy, including a first authorization policy, is stored on at least one non-transitory processor 126 of a vehicle device 122. In some cases, the at least one authorization policy is received by a communication interface 128 of vehicle device 122, as is discussed later with reference to FIGS. 19 and 21. This could be at an initialization of the vehicle device 122 when the vehicle device 122 is installed in a vehicle 120, or at a subsequent update of the vehicle device 122. In other cases, the vehicle device 122 could be shipped to a purchaser or customer with the at least one authorization policy stored on the at least one non-transitory processor-readable storage medium 126. Authorization policies, and details thereof, are described below with reference to FIG. 3.

Figure 3:
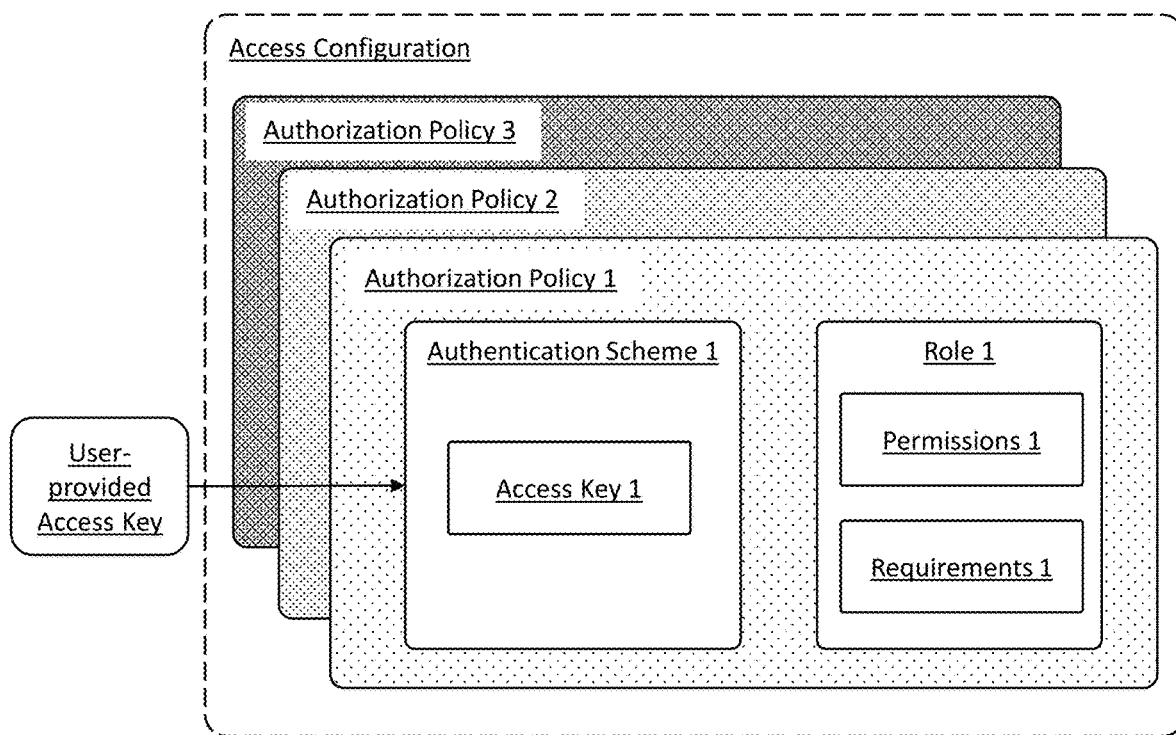
FIGS. 3 and 4 are schematic diagrams of an exemplary plurality of authorization policies.

FIG. 3 is a schematic diagram of a plurality of authorization policies which can be stored on any of the non-transitory processor readable mediums described herein, including the at least one non-transitory processor-readable storage medium 126 as is described in act 202 of method 200 in FIG. 2. In particular, FIG. 3 illustrates three authorization policies stored on vehicle device 122 (or more specifically, on at least one non-transitory processor-readable storage medium 126 of vehicle device 122): the three authorization policies including Authorization Policy 1, Authorization Policy 2, and Authorization Policy 3. Fewer or more authorization policies could be stored on the at least one non-transitory processor-readable storage medium 126, as appropriate for a given application.

Collectively, a group of at least on authorization policies can be grouped together in an Access Configuration. An access configuration is useful for packaging authorization policies together, for streamlined updating and partitioning of different roles within an Access Configuration by respective authorization policies corresponding to said roles. Roles are described in greater detail below, and access configurations are described in more detail with reference to FIGS. 19 and 21.

Generally, each Authorization Policy includes an Authentication Scheme, an indication of Permissions, and an indication of Requirements. An authentication scheme is for authenticating an access key to use the vehicle in according with a corresponding Authorization Policy. An indication of Permissions specifies at least one vehicle operation is permitted under the corresponding Authorization Policy. An indication of Requirements specifies vehicle access requirements to perform each of the at least one vehicle operations permitted under the Permissions of the corresponding Authorization Policy.

Authorization Policy 1 is shown in FIG. 3 as including an Authentication Scheme 1, for authenticating against an Access Key 1 to use the vehicle 120 in accordance with the Authorization Policy 1. Authorization Policy 1 is also shown in FIG. 3 as including a Role 1, which is defined by Permissions 1 and Requirements 1. Permissions 1 indicates at least one vehicle operation which is permitted under Authorization Policy 1. Requirements 1 indicates at least one vehicle access requirement to perform each of the at least one vehicle operation specified in Permissions 1.

Authentication Schemes are discussed in more detail below with reference to act 206 in method 200. Permissions are discussed in more detail below with reference to act 212 in method 200. Requirements are discussed in more detail below with reference to act 214 in method 200.

Returning to method 200, at 204, vehicle device 122 receives a user-provided access key from a user. In some implementations, the user-provided access key is provided by optional device 130 in FIG. 1. In one exemplary case, optional device 130 comprises an identification device (such as an NFC or RFID card, tag or other device), and a user places the identification device in proximity to an identification device reader coupled to vehicle device 122, which initiates the identification device providing the user-provided access key. The user-provided access key is received by the identification device reader and in turn vehicle device 122. In another exemplary case, optional device 130 comprises a wireless device (such as smartphone, tablet, PDA, or other appropriate device), and the user initiates wireless communication (e.g. Bluetooth®, WiFi®, ZigBee®, cellular connection, or similar) with a communication interface 128 of vehicle device 122, where the wireless device provides the user-provided access key which is received by the vehicle device 122. In yet another exemplary case, vehicle device 122 may include or be communicatively coupled to an input device (e.g. a keypad) by which a user inputs an access key, which is received by vehicle device 122.

Throughout this disclosure, acts directed to "receiving" of some data or information reference appropriate hardware performing any necessary data processing or handling to receive or intake the data or information. Such handling or processing could for example include establishing connection (e.g. handshake procedures with other devices), reformatting, or decompressing data, as appropriate.

At 206, at least one processor 124 of vehicle device 122 attempts to authenticate access to the vehicle 120 under the first authorization policy (e.g. Authorization Policy 1 in FIG. 3). The at least one processor 124 attempts to authenticate the user-provided access key against a first access key included in the first authorization policy, in accordance with the first authentication scheme. In the example of FIG. 3, the at least one processor 124 attempts to authenticate the User-Provided Access Key against Access Key 1 included in the Authentication Scheme 1. An authentication scheme in an authorization policy can include one or more authentication sub-schemes, if appropriate for a given application. As an example, an authentication scheme can include a Trusted Issuer authentication sub-scheme (useful for wireless communication such as Bluetooth®, WiFi®, ZigBee®, cellular connection or similar) and a Self-Signed authentication sub-scheme (useful for NFC or RFID communication). Based on how the user-provided access key is received, or the nature of the user-provided access key, an appropriate authentication sub-scheme is selected for attempting authentication of the user-provided access key.

If authentication at 206 is unsuccessful (the user-provided access key is not authenticated for vehicle access under the first authorization policy), method 200 proceeds to 208, where access to the vehicle 120 is denied to the user under the first authorization policy. As an example, the at least one processor 124 of vehicle device 122 can prevent any vehicle operations from being performable under the first authorization policy. Optionally, method 200 can proceed to method 500, where authentication is attempted under at least one other authorization policy, as discussed later with reference to FIG. 5.

If authentication at 206 is successful, method 200 proceeds to 210. At 210, a user request is received by vehicle device 122 to perform a user-requested vehicle operation. Receiving a user request to perform a user-requested operation can comprise receiving an indication of an attempt by the user to perform the user-requested vehicle operation. As one example, a user could provide a request to unlock the vehicle 120 (e.g. by selecting an "unlock vehicle" option on optional device 130, or by tugging a handle or pushing an open button on a door of vehicle 120, as non-limiting examples). As another example, a user could provide a request to start an ignition of the vehicle 120 (e.g. by pushing a start button in the vehicle 120, or by inserting a key into an ignition of the vehicle 120 and cranking the key). Many other examples of vehicle operations can be requested.

In some cases, the user request to perform a user-requested vehicle operation may be "received" even if authentication is unsuccessful at 206, but it may not be processed or acted on. For example, the user may tug on a handle of vehicle 120, even if authentication is unsuccessful at 206. However, because authentication was not successful, acts 212 and 214 are not performed (i.e. the user request is ignored).

At 212, the at least one processor 124 determines whether the user requested vehicle operation is included in at least one first vehicle operation permitted under the first authorization policy. What is meant by "permitted" in this context is that, when an authorization policy is established, users who can authenticate under the authorization policy may be restricted to only being able to perform certain vehicle operations. For example, cleaning staff may be permitted to unlock the vehicle, but may not be permitted to start an ignition of the vehicle or engage motion of the vehicle. In contrast, a mechanic may be given full access to the vehicle. Some non-limiting examples of vehicle operations, which may or may not be permitted under a given authorization policy, include: unlocking at least one door of the vehicle; locking at least one door of the vehicle; unlocking a service access of the vehicle (e.g. an engine compartment); locking a service access of the vehicle; enabling an ignition of the vehicle; disabling an ignition of the vehicle; starting an engine of the vehicle; turning off an engine of the vehicle; enabling movement of the vehicle; disabling movement of the vehicle; disengaging a parking brake of the vehicle; engaging the parking brake of the vehicle; providing an indication of a location of the vehicle (e.g. locating the vehicle on a map of a user device); providing an indication of a location of a device in the vehicle (e.g. indicating where a physical key storage box in the vehicle is located); activating at least one light of the vehicle; activating a horn of the vehicle; and reversing authentication of the user for the vehicle (i.e. "logging out" or "vacating" the vehicle).

If at 212 the at least one processor 124 determines that the user-requested operation is not included in the at least one first vehicle operation permitted under the first authorization policy (the user is not permitted to perform the first vehicle operation), method 200 proceeds to 218, where the user request is denied to perform the user-requested vehicle operation. Denial of the request includes not performing the requested operation, and may optionally include providing some indication to the user that the requested operation is not permitted (e.g. by presenting a notification on the wireless device of the user if applicable, by displaying a notification on an infotainment or other display of the vehicle 120, by playing a notification by at least one speaker of the vehicle 120, by flashing at least one light of the vehicle 120, or any other appropriate means of conveying that the operation is not permitted).

If at 212 the at least one processor 124 determines that the user-requested operation is included in the at least one first vehicle operation permitted under the first authorization policy (the user is permitted to perform the first vehicle operation), method 200 proceeds to 214. At 214, the at least one processor 124 determines whether a respective at least one first vehicle access requirement to perform the user-requested vehicle operation is met. "Requirements" are different from "Permissions", in that even if an operation is permitted under and authorization policy, performing the operation may not be possible or appropriate under the circumstances. For example, if a user attempts to use a vehicle, but the vehicle is already reserved or in use by another user, the user may be denied access to the vehicle. Non-limiting examples of requirements include: the vehicle being vacant (i.e. no other user is presently authenticated to use the vehicle); the vehicle not being reserved for use by another user (i.e. no other user has reserved use of the vehicle presently, or in the near future); the vehicle being reserved for use by the user (i.e. the user attempting to use the vehicle must have a reservation for the vehicle); and the vehicle being operable (i.e. the vehicle is not out of service or undergoing maintenance).

If at 214 the at least one processor 124 determines that the respective at least one first vehicle access requirement to perform the user-requested vehicle operation is not met (the first vehicle operation is not possible or appropriate under the circumstances), method 200 proceeds to 218, where the user request is denied to perform the user-requested vehicle operation. Similar to as discussed above, denial of the request includes not performing the requested operation, and may optionally include providing some indication to the user that the requested operation is not permitted. The nature of the indication that requirements are not met as presented to the user may be different from an indication that the vehicle operation is not permitted. For example, text presented in a notification on the wireless device of the user or on an infotainment or other display of the vehicle 120, a notification played by at least one speaker of the vehicle 120, or a pattern of flashing of at least one light of the vehicle 120 may be specific to the reason the user request is denied.

If at 214 the at least one processor 124 determines that the respective at least one first vehicle access requirement to perform the user-requested vehicle operation is met (the first vehicle operation is possible), method 200 proceeds to 216. At 216, the user-requested vehicle operation is performed (or allowed to be performed). For example, the vehicle device 122 can send a signal to components of the vehicle 120 to cause the operation to be performed. For example, an unlock signal could be sent to power locks of vehicle 120, or a start signal could be sent to an ignition of the vehicle 120, as non-limiting examples. In some implementations, vehicle device 122 itself performs the vehicle operation (e.g. sending an unlock signal to doors of the vehicle). In other implementations, vehicle device 122 allows the vehicle 120 to perform the vehicle operation (e.g. enabling a motor of vehicle 120 to impart motion).

Method 200 illustrates act 212 as being followed sequentially by act 214, but this is not necessarily required. In some implementations, act 214 is performed before act 212. In other implementations, acts 212 and 214 are performed concurrently. In this way, a determination is made where (i) if the user-requested vehicle operation is included in at least one first vehicle operation permitted under the first authorization policy, AND (ii) if a respective at least one first vehicle access requirement to perform the user-requested vehicle operation is met, then the method 200 proceeds to 216 where the user-requested vehicle operation is performed. On the other hand, (i) if the user-requested vehicle operation is NOT included in at least one first vehicle operation permitted under the first authorization policy, OR (ii) if a respective at least one first vehicle access requirement to perform the user-requested vehicle operation is NOT met, then the method 200 proceeds to 218 where the user request to perform the user-requested vehicle operation is denied.

With reference to act 202 of method 200 described above, at least one authorization policy is stored on at least one non-transitory processor 126 of a vehicle device 122. In addition to the first authorization policy mentioned in act 202 (and exemplified as Authorization Policy 1 in FIG. 3), a second authorization policy can also be stored on the at least one non-transitory processor-readable medium 126. This is exemplified in FIG. 3 as Authorization Policy 2. Further, FIG. 4 is a schematic diagram of a plurality of authorization policies similar to FIG. 3, which can be stored on any of the non-transitory processor readable mediums described herein, including the at least one non-transitory processor-readable storage medium 126 as is described in act 202 of method 200 in FIG. 2.

Figure 4:
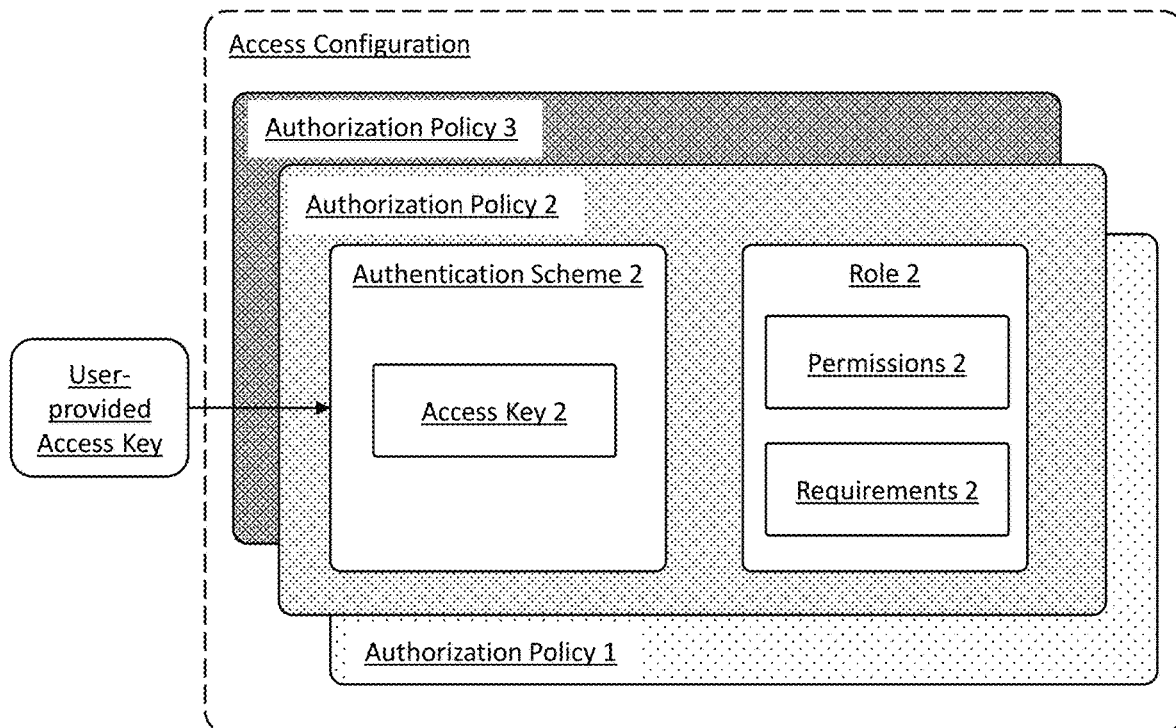

One difference between FIG. 4 and FIG. 3 is that FIG. 4 focuses more specifically on Authorization Policy 2. In particular FIG. 4 shows Authorization Policy 2 as including an Authentication Scheme 2, for authenticating against an Access Key 2 to access the vehicle 120 in accordance with the Authorization Policy 2. Authorization Policy 2 is also shown in FIG. 4 as including a Role 2, which is defined by Permissions 2 and Requirements 2. Permissions 2 indicates at least one vehicle operation which is permitted under Authorization Policy 2. Requirements 2 indicates at least one vehicle access requirement to perform each of the at least one vehicle operation specified in Permissions 2.

Figure 5:
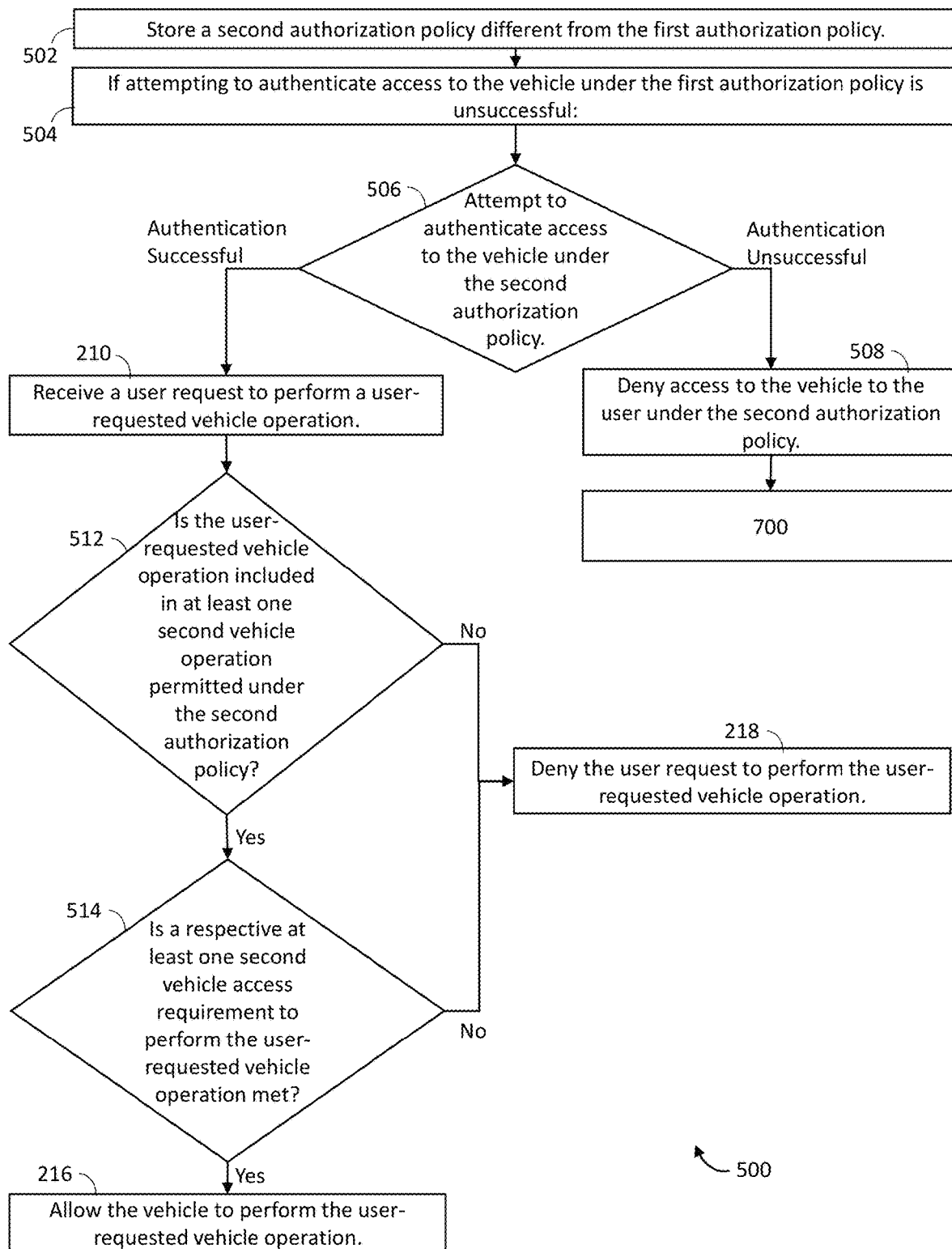
FIG. 5 is a flowchart diagram of a method for managing shared access to a vehicle, in accordance with another exemplary illustrated implementation.

FIG. 5 is a flowchart diagram which illustrates an exemplary method 500 performed by devices such as those in FIG. 1. Method 500 is in some ways similar to method 200 discussed with reference to FIG. 2, and description of method 200 also applies to method 500 unless context dictates otherwise. For example, acts of method 500 are performed by hardware similarly to as described with reference to method 200. Method 500 as illustrated includes acts 502, 504, 506, 508, 210, 512, 514, 216 and 218. One skilled in the art will appreciate that additional acts could be added, acts could be removed, or acts could be reordered as appropriate for a given application.

Method 500 is an optional supplemental method to method 200 in FIG. 2. In particular, in method 200, where attempting to authenticate access to the vehicle 120 under the first authorization policy at 206 is unsuccessful, vehicle access is denied to the user under the first authorization policy at 208, and method 500 can optionally be performed for providing vehicle access to the user under a second authorization policy.

At 502, a second authorization policy different from the first authorization policy is stored at the at least one non-transitory processor-readable storage medium 126. Discussion of storing the first authorization policy at 202 is applicable to storing the second authorization policy at 502. Further, act 502 can be performed as a sub-act to act 202 in method 200, regardless of whether attempting to authenticate access to the vehicle 120 under the first authorization policy is successful at 206. That is, at 202 in method 200, the at least one authorization policy stored can include the first authorization policy, and the second authorization policy different from the first authorization policy. With reference to FIGS. 3 and 4, act 202 and 502 can be performed together, to store Authorization Policy 1 and Authorization Policy 2 on the at least one non-transitory processor-readable storage medium 126.

At 504, if attempting to authenticate access to the vehicle under the first authorization policy is unsuccessful (as in 206 of method 200), method 500 proceeds to act 506.

At 506, the at least one processor 124 attempts to authenticate access to the vehicle 120 under the second authorization policy. Act 506 in method 500 is similar to act 206 in method 200, and description of act 206 applies to act 506 unless context requires otherwise. One difference between act 506 and act 206, is that in act 506, the at least one processor 124 attempts to authenticate the user-provided access key (received at 204 of method 200) to a second access key in accordance with a second authentication scheme included in the second authorization policy. With reference to the example of FIG. 4, at 506 the at least one processor 124 attempts to authenticate the User-Provided Access Key against Access Key 2, in accordance with Authentication Scheme 2 included in Authorization Policy 2.

If authentication at 506 is unsuccessful (the user-provided access key is not authenticated for vehicle access under the second authorization policy), method 500 proceeds to 508, where access to the vehicle 120 is denied to the user under the second authorization policy. Similar to act 208 in method 200, at 508, as an example, the at least one processor 124 of vehicle device 122 can prevent any vehicle operations from being performable under the second authorization policy. Optionally, method 500 can proceed to method 700, where authentication is attempted under yet another at least one authorization policy, as discussed later with reference to FIG. 7.

If authentication at 506 is successful, method 500 proceeds to 210. At 210, a user request is received by vehicle device 122 to perform a user-requested vehicle operation. Act 210 in method 500 is similar to act 210 in method 200, and description of act 210 in method 200 applies to act 210 in method 500.

At 512, the at least one processor 124 determines whether the user requested vehicle operation is included in at least one second vehicle operation permitted under the second authorization policy. Act 512 in method 500 is similar to act 212 in method 200, and description of act 212 in method 200 applies to act 512 in method 500. One difference between act 512 and act 212 is that in act 512, determination of permissions is based on the second authorization policy. Permissions indicated in the second authorization policy can be at least partially different from permissions indicated in the first authorization policy. In one non-limiting example, with reference to FIGS. 3 and 4, Authorization Policy 1 (first authorization policy) can be for maintenance or service workers, who perform repair services for vehicle, whereas Authorization Policy 2 (second authorization policy) can be for vehicle drivers. In such an example, Permissions 1 in Authorization Policy 1 can provide full access to all operations of the vehicle, including a service access (e.g. an engine compartment) of the vehicle. In contrast, Permissions 2 in Authorization Policy 2 may only provide access to operations of the vehicle related to driving the vehicle, such as unlocking and locking the vehicle, starting an ignition of the vehicle, engaging motion of the vehicle, etcetera, whereas other operations such as unlocking a service access of the vehicle may not be permitted in Permissions 2. This prevents access to important vehicle operations by unqualified persons.

If at 512 the at least one processor 124 determines that the user-requested operation is not included in the at least one second vehicle operation permitted under the second authorization policy (the user is not permitted to perform the second vehicle operation), method 500 proceeds to 218, where the user request is denied to perform the user-requested vehicle operation. The description of act 218 in method 200 is applicable to act 218 in method 500, and is not repeated for brevity.

If at 512 the at least one processor 124 determines that the user-requested operation is included in the at least one second vehicle operation permitted under the second authorization policy (the user is permitted to perform the second vehicle operation), method 500 proceeds to 514. At 514, the at least one processor 124 determines whether a respective at least one second vehicle access requirement to perform the user-requested vehicle operation is met. Act 514 in method 500 is similar to act 214 in method 200, and description of act 214 in method 200 applies to act 514 in method 500. One difference between act 514 and act 214 is that in act 514, determination of whether requirements are met is based on the second authorization policy. Requirements indicated in the second authorization policy can be at least partially different from requirements indicated in the first authorization policy. Reference is again made to the non-limiting example discussed above, where Authorization Policy 1 (first authorization policy) is for maintenance or service workers, who perform repair services for vehicle, whereas Authorization Policy 2 (second authorization policy) is for vehicle drivers. In such an example, Requirements 1 in Authorization Policy 1 can be less strict to allow service workers access to vehicle operations in more circumstances. For example, Requirements 1 may not require that the vehicle be vacant or non-reserved in order for a service worker to perform vehicle operations. In this way, a service worker can still perform vehicle maintenance in the event of a vehicle breakdown or malfunction while another user is using the vehicle or has the vehicle reserved. In contrast, Requirements 2 in Authorization Policy 2 may require that the vehicle be vacant or non-reserved in order for a driver to perform vehicle operations. This prevents a driver taking over a vehicle which is in use or reserved for use by another driver.

If at 514 the at least one processor 124 determines that the respective at least one second vehicle access requirement to perform the user-requested vehicle operation is not met (the second vehicle operation is not possible or appropriate under the circumstances), method 500 proceeds to 218, where the user request is denied to perform the user-requested vehicle operation. Similar to as discussed above, denial of the request is similar to as discussed with reference to method 200, and is not repeated for brevity.

If at 514 the at least one processor 124 determines that the respective at least one second vehicle access requirement to perform the user-requested vehicle operation is met (the second vehicle operation is possible), method 500 proceeds to 216. At 216, the user-requested vehicle operation is performed (or allowed to be performed). The discussion of act 216 in method 200 is applicable to act 216 in method 500, and is not repeated for brevity.

Method 500 illustrates act 512 as being followed sequentially by act 514, but this is not necessarily required. In some implementations, act 514 is performed before act 512. In other implementations, acts 512 and 514 are performed concurrently. In this way, a determination is made where (i) if the user-requested vehicle operation is included in at least one second vehicle operation permitted under the second authorization policy, AND (ii) if a respective at least one second vehicle access requirement to perform the user-requested vehicle operation is met, then the method 500 proceeds to 216 where the user-requested vehicle operation is performed. On the other hand, (i) if the user-requested vehicle operation is NOT included in at least one second vehicle operation permitted under the second authorization policy, OR (ii) if a respective at least one second vehicle access requirement to perform the user-requested vehicle operation is NOT met, then the method 500 proceeds to 218 where the user request to perform the user-requested vehicle operation is denied.

With reference to act 202 of method 200 and act 502 of method 500 described above, at least one authorization policy is stored on at least one non-transitory processor 126 of a vehicle device 122. In addition to the first authorization policy mentioned in act 202 (and exemplified as Authorization Policy 1 in FIG. 3), and the second authorization policy mentioned in act 502 (and exemplified as Authorization Policy 2 in FIG. 4), at least one additional authorization policy can also be stored on the at least one non-transitory processor-readable medium 126. This is exemplified in FIGS. 3 and 4 as Authorization Policy 3, though any number of additional authorization policies could be stored, as is appropriate for a given application. Further, FIG. 6 is a schematic diagram of a plurality of authorization policies similar to FIGS. 3 and 4, which can be stored on any of the non-transitory processor readable mediums described herein, including the at least one non-transitory processor-readable storage medium 126 as is described in act 202 of method 200 in FIG. 2 and act 502 of method 500 in FIG. 5.

Figure 6:
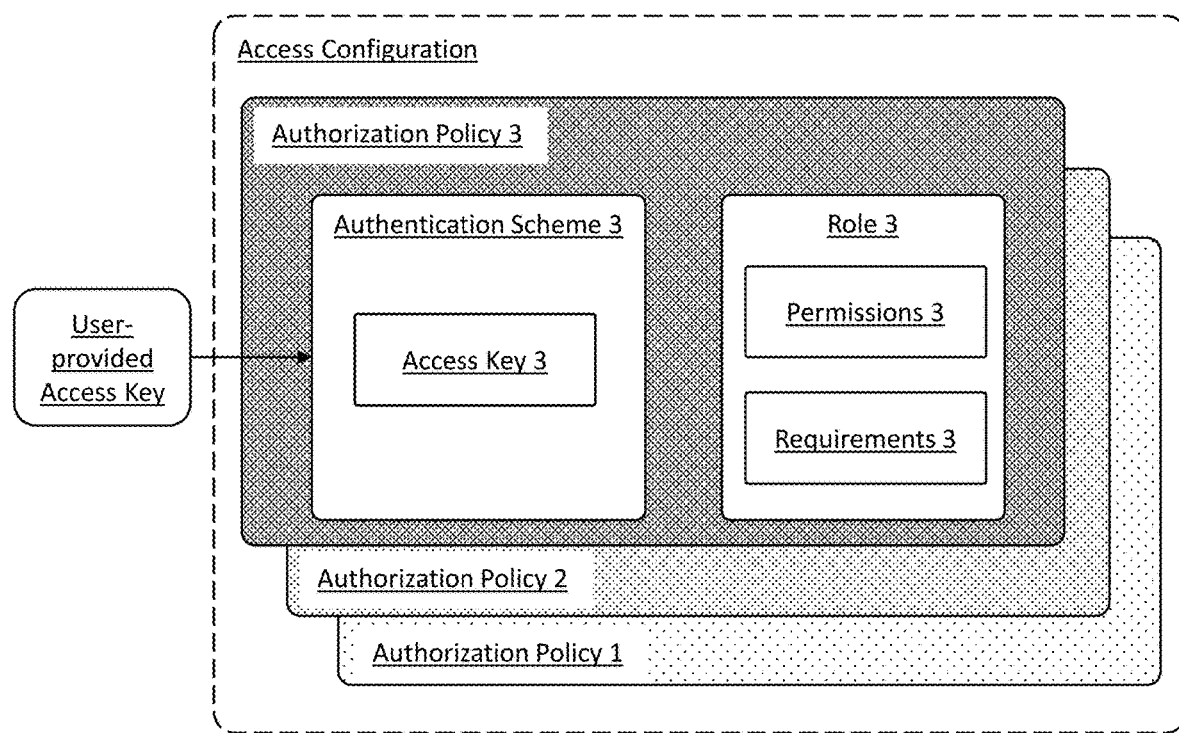
FIG. 6 is a schematic diagram of an exemplary plurality of authorization policies.

One difference between FIG. 6 and FIGS. 3 and 4 is that FIG. 6 focuses more specifically on Authorization Policy 3. In particular, FIG. 6 shows Authorization Policy 3 as including an Authentication Scheme 3, for authenticating against an Access Key 3 to use the vehicle 120 in accordance with the Authorization Policy 3. Authorization Policy 3 is also shown in FIG. 6 as including a Role 3, which is defined by Permissions 3 and Requirements 3. Permissions 3 indicates at least one vehicle operation which is permitted under Authorization Policy 3. Requirements 3 indicates at least one vehicle access requirement to perform each of the at least one vehicle operation specified in Permissions 3.

Figure 7:
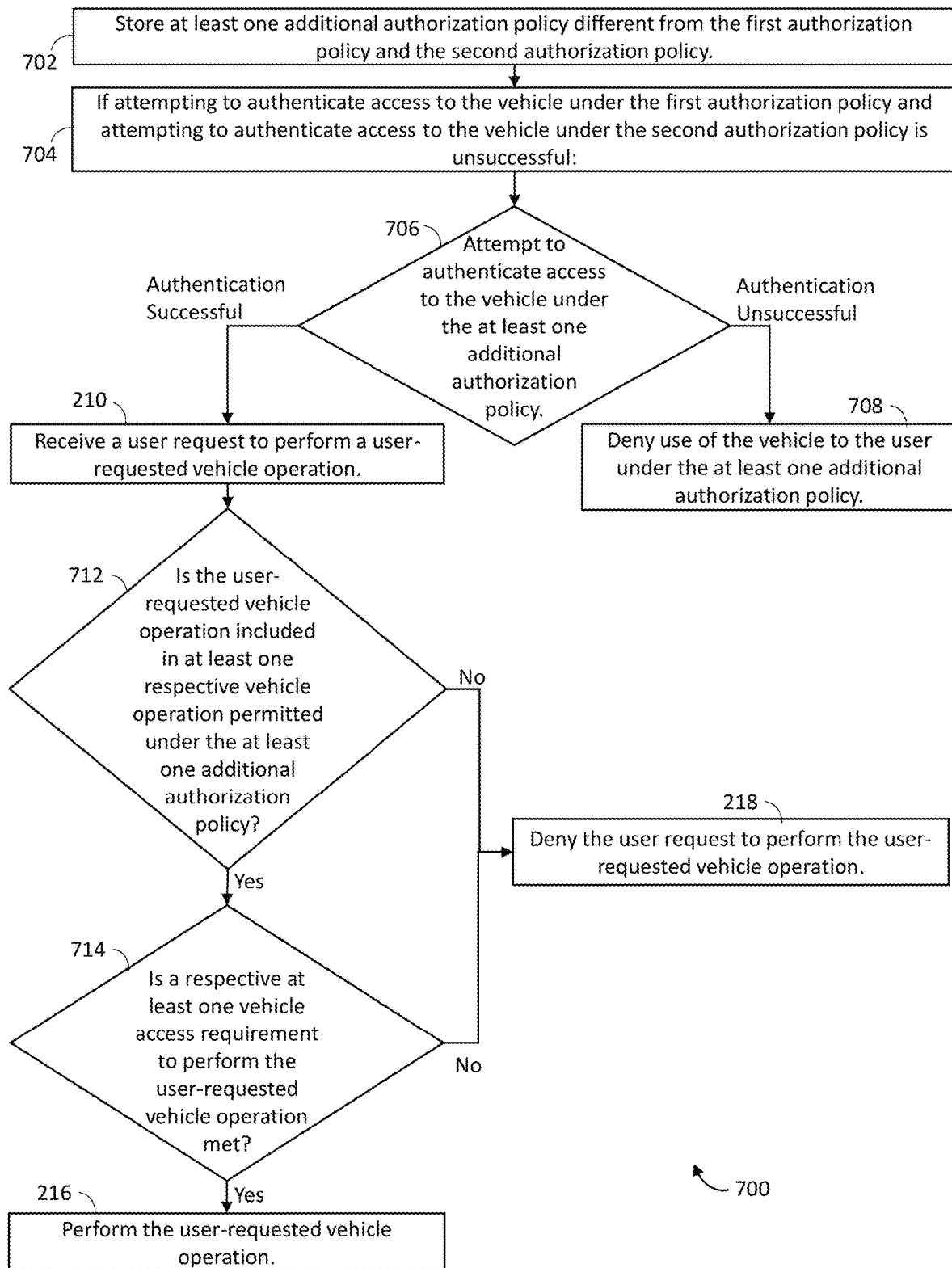
FIG. 7 is a flowchart diagram of a method for managing shared access to a vehicle, in accordance with yet another exemplary illustrated implementation.

FIG. 7 is a flowchart diagram which illustrates an exemplary method 700 performed by devices such as those in FIG. 1. Method 700 is in some ways similar to method 200 discussed with reference to FIG. 2, and description of method 200 also applies to method 700 unless context dictates otherwise. Method 700 is also in some ways similar to method 500 discussed with reference to FIG. 5, and description of method 500 also applies to method 700 unless context dictates otherwise. For example, acts of method 700 are performed by hardware similarly to as described with reference to method 200. Method 700 as illustrated includes acts 702, 704, 706, 708, 210, 712, 714, 216 and 218. One skilled in the art will appreciate that additional acts could be added, acts could be removed, or acts could be reordered as appropriate for a given application.

Method 700 is an optional supplemental method to method 500 in FIG. 5. In particular, in method 500, where attempting to authenticate access to the vehicle under the second authorization policy at 506 is unsuccessful, vehicle access is denied to the user under the second authorization policy at 508, and method 700 can optionally be performed for providing vehicle access to the user under an additional authorization policy.

At 702, at least one additional authorization policy different from the first authorization policy and the second authorization policy is stored at the at least one non-transitory processor-readable storage medium 126. Discussion of storing the first authorization policy at 202 and storing the second authorization policy at 502 is applicable to storing the at least one additional authorization policy at 702. Further, act 702 can be performed as a sub-act to act 202 in method 200 or act 502 in method 500, regardless of whether attempting to authenticate access to the vehicle 120 under the first authorization policy is successful at 206 or whether attempting to authenticate access to the vehicle 120 under the second authorization policy is successful at 506. That is, at 202 in method 200, the at least one authorization policy stored can include the first authorization policy, the second authorization policy different from the first authorization policy, and the at least one additional authorization policy different from the first authorization policy and the second authorization policy. With reference to FIGS. 3, 4, and 6, acts 202, 502, and 702 can be performed together, to store Authorization Policy 1, Authorization Policy 2, Authorization Policy 3, and any appropriate number of additional authorization policies on the at least one non-transitory processor-readable storage medium 126.

At 704, if attempting to authenticate access to the vehicle under the first authorization policy and the second authorization policy is unsuccessful (as in act 206 of method 200 and act 506 of method 500), method 700 proceeds to act 706.

At 706, the at least one processor 124 attempts to authenticate access to the vehicle 120 under the at least one additional authorization policy. Act 706 in method 700 is similar to act 206 in method 200, and to act 506 in method 500. As such, description of acts 206 and 506 applies to act 706 unless context requires otherwise. One difference between act 706 and acts 206 and 506, is that in act 706, the at least one processor 124 attempts to authenticate the user-provided access key (received at 204 of method 200) to a respective access key in accordance with a respective authentication scheme included in the at least one additional authorization policy. This can be performed for each additional authorization policy of the at least one additional authorization policy. With reference to the example of FIG. 6, at 706 the at least one processor 124 attempts to authenticate the User-Provided Access Key against Access Key 3, in accordance with Authentication Scheme 3 included in Authorization Policy 3.

If authentication at 706 is unsuccessful (the user-provided access key is not authenticated for vehicle access under the at least one additional authorization policy), method 700 proceeds to 708, where access to the vehicle 120 is denied to the user under the at least one authorization policy. Similar to act 208 in method 200 and act 508 in method 500, at 708, as an example, the at least one processor 124 of vehicle device 122 can prevent any vehicle operations from being performable under the at least one additional authorization policy. Where the at least one additional authorization policy includes a plurality of additional authorization policies, act 706 can be repeated as needed with each additional authorization policy, until authentication is successful, or until there are no authentication policies left to attempt authentication under.

If authentication at 706 is successful, method 700 proceeds to 210. At 210, a user request is received by vehicle device 122 to perform a user-requested vehicle operation. Act 210 in method 700 is similar to act 210 in method 200, and description of act 210 in method 200 applies to act 210 in method 700.

At 712, the at least one processor 124 determines whether the user requested vehicle operation is included in at least one respective vehicle operation permitted under the at least one additional authorization policy. Act 712 in method 700 is similar to act 212 in method 200 and act 512 in method 500, and description of acts 212 and 512 applies to act 712 in method 700. One difference between act 712 and acts 212 and 512 is that in act 712, determination of permissions is based on the at least one additional authorization policy (specifically, the additional authorization policy for which authentication was successful at 706). Permissions indicated in the at least one additional authorization policy can be at least partially different from permissions indicated in the first authorization policy and permissions indicated in the second authorization policy. In one non-limiting example, with reference to FIGS. 3, 4, and 6, Authorization Policy 1 (first authorization policy) can be for maintenance or service workers, who perform repair services for the vehicle; Authorization Policy 2 (second authorization policy) can be for vehicle drivers; and Authorization Policy 3 (at least one additional authorization policy) can be for cleaning staff who perform cleaning for the vehicle. In such an example, Permissions 1 in Authorization Policy 1 can provide full access to all operations of the vehicle, including a service access (e.g. an engine compartment) of the vehicle. In contrast, Permissions 2 in Authorization Policy 2 may only provide access to operations of the vehicle related to driving the vehicle, such as unlocking and locking the vehicle, starting an ignition of the vehicle, engaging motion of the vehicle, etcetera, whereas other operations such as unlocking a service access of the vehicle may not be permitted in Permissions 2. Further, Permissions 3 in Authorization Policy 3 may only provide access to operations of the vehicle related to cleaning the vehicle, such as unlocking and locking the vehicle, whereas other operations such as starting an ignition of the vehicle may not be permitted in Permissions 3. This limits vehicle usage to essential actions by a user accessing the vehicle.

If at 712 the at least one processor 124 determines that the user-requested operation is not included in the at least one respective vehicle operation permitted under the at least one additional authorization policy (the user is not permitted to perform the respective vehicle operation), method 700 proceeds to 218, where the user request is denied to perform the user-requested vehicle operation. The description of act 218 in method 200 is applicable to act 218 in method 500, and is not repeated for brevity.

If at 712 the at least one processor 124 determines that the user-requested operation is included in the at least one respective vehicle operation permitted under the at least one authorization policy (the user is permitted to perform the respective vehicle operation), method 700 proceeds to 714. At 714, the at least one processor 124 determines whether a respective at least one vehicle access requirement to perform the user-requested vehicle operation is met. Act 714 in method 700 is similar to act 214 in method 200 and act 514 in method 500, and description of acts 214 and 514 applies to act 714 in method 700. One difference between act 714 and acts 214 and 514 is that in act 714, determination of whether requirements are met is based on the at least one additional authorization policy (specifically, the additional authorization policy for which authentication was successful at 706). Requirements indicated in the additional authorization policy can be at least partially different from requirements indicated in the first authorization policy and requirements indicated in the second authorization policy. Reference is again made to the non-limiting example discussed above, where Authorization Policy 1 (first authorization policy) is for maintenance or service workers, who perform repair services for vehicle; Authorization Policy 2 (second authorization policy) is for vehicle drivers; and Authorization Policy 3 (at least one additional authorization policy) is for cleaning staff. In such an example, Requirements 1 in Authorization Policy 1 can be less strict to allow service workers access to vehicle operations in more circumstances. For example, Requirements 1 may not require that the vehicle be vacant or non-reserved in order for a service worker to perform vehicle operations. In this way, a service worker can still perform vehicle maintenance in the event of a vehicle breakdown or malfunction while another user is using the vehicle or has the vehicle reserved. In contrast, Requirements 2 in Authorization Policy 2 may require that the vehicle be vacant or non-reserved in order for a driver to perform vehicle operations. This prevents a driver taking over a vehicle which is in use or reserved for use by another driver. Further, Requirements 3 in Authorization Policy 3 may require that the vehicle be vacant to perform vehicle operations.

If at 714 the at least one processor 124 determines that the respective at least one vehicle access requirement to perform the user-requested vehicle operation is not met (the vehicle operation is not possible or appropriate under the circumstances), method 700 proceeds to 218, where the user request is denied to perform the user-requested vehicle operation. Similar to as discussed above, denial of the request is similar to as discussed with reference to method 200, and is not repeated for brevity.

If at 714 the at least one processor 124 determines that the respective at least one vehicle access requirement to perform the user-requested vehicle operation is met (the vehicle operation is possible), method 700 proceeds to 216. At 216, the user-requested vehicle operation is performed (or allowed to be performed). The discussion of act 216 in method 200 is applicable to act 216 in method 700, and is not repeated for brevity.

Method 700 illustrates act 712 as being followed sequentially by act 714, but this is not necessarily required. In some implementations, act 714 is performed before act 712. In other implementations, acts 712 and 714 are performed concurrently. In this way, a determination is made where (i) if the user-requested vehicle operation is included in at least one respective vehicle operation permitted under the at least one additional authorization policy, AND (ii) if a respective at least one vehicle access requirement to perform the user-requested vehicle operation is met, then the method 700 proceeds to 216 where the user-requested vehicle operation is performed. On the other hand, (i) if the user-requested vehicle operation is NOT included in at least one respective vehicle operation permitted under the at least one additional authorization policy, OR (ii) if a respective at least one vehicle access requirement to perform the user-requested vehicle operation is NOT met, then the method 700 proceeds to 218 where the user request to perform the user-requested vehicle operation is denied.

FIGS. 3, 4, and 6 show, for each authorization policy, that permissions and requirements are specified in the context of a "role". That is, a "role" refers to an occupation, title, set of responsibilities, or any other appropriate aspects of a given user, for which vehicle access circumstances are tailored. In the examples discussed above, "service or maintenance worker" can be a role, "driver" can be a role, and "cleaning staff" can be a role, among any other appropriate roles. A "role" itself doesn't have to be indicated explicitly in each authorization policy, but permissions and requirements are set such that each authorization corresponds to at least one "role". In turn, users are provisioned an access key which is generic to their role. For example, service workers for a fleet are each given a first generic access key, drivers are each given a second generic access key, cleaning staff are given a third generic access key. When a user attempts to access a vehicle, they provide the access key provisioned to them (as the User Provided Access Key in FIGS. 3, 4, and 6). Authentication to access the vehicle will occur according to the authorization policy corresponding to the User Provided Access Key. In this way, users access the vehicle according to an authorization policy corresponding to their role, which in turn prescribes permissions and requirements for vehicle operations the user can perform within the context of their role.

Methods 200 in FIG. 2, 500 in FIG. 5, and 700 in FIG. 7 show an overarching method where authentication is attempted sequentially under different authorization policies, until authentication is successful under a particular authorization policy, or there are no authorization policies left to attempt authentication. While FIGS. 3, 4, and 6 illustrate Authorization Policy 1, Authorization Policy 2, and Authorization Policy 3, this does not necessarily dictate a required order for attempting authentication. Further, it is not necessarily the case that authentication is attempted sequentially for different authorization policies. Instead, an appropriate authorization policy can be selected for authentication. This is discussed below with reference to FIG. 8.

Figure 8:
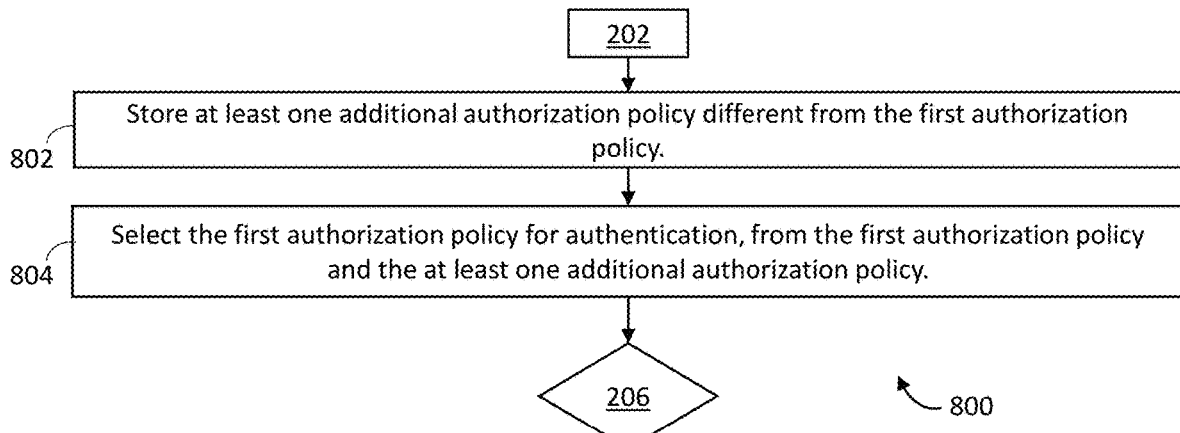
FIG. 8 is a flowchart diagram of a method for selecting an authorization policy, in accordance with an exemplary illustrated implementation.

FIG. 8 is a flowchart diagram which illustrates an exemplary method 800 performed by devices such as those in FIG. 1. For example, acts of method 800 are performed by hardware similarly to as described with reference to method 200 in FIG. 2. Method 800 is an optional supplemental method to method 200 in FIG. 2, and in particular method 800 as illustrated includes acts 802 and 804 which precede act 206 of method 200. FIG. 8 shows acts 802 and 804 as being subsequent act 202 of method 200. This can be the case in some implementations, but in other implementations act 802 is a sub-act of act 202 as discussed later. One skilled in the art will appreciate that additional acts could be added, acts could be removed, or acts could be reordered as appropriate for a given application.

At 802, at least one additional authorization policy different from the first authorization policy is stored at the at least one non-transitory processor-readable storage medium 126. Optionally, at 802, the at least one additional authorization policy includes the second authorization policy described with reference to method 500 in FIG. 5, or the at least one additional authorization policy discussed with reference to method 700 in FIG. 7. Discussion of storing the first authorization policy at 202, storing the second authorization policy at 502, and storing the at least one additional authorization policy at 702 is applicable to storing the at least one additional authorization policy at 802. Further, act 802 can be performed as a sub-act to act 202 in method 200. That is, at 202 in method 200, the at least one authorization policy stored can include the first authorization policy, and the at least one additional authorization policy different from the first authorization policy (any appropriate authorization policies, including Authorization Policy 1, Authorization Policy 2, and/or Authorization Policy 3 in FIGS. 3, 4, and 6). In method 800, "the at least one authorization policy" referenced in act 202 of method 200 effectively includes a plurality of different authorization policies. Similar to as discussed with reference to FIGS. 3, 4, and 6, each authorization policy includes a respective authentication scheme, an indication of at least one respective vehicle operation which is permitted under the authorization policy, and an indication of at least one respective vehicle access requirement to perform each of the at least one respective vehicle operation permitted under the authorization policy.

At 804, the first authorization policy is selected for authentication, from the first authorization policy and the at least one additional authorization policy. Subsequent 804, method 800 returns to act 206 of method 200, where authentication is attempted to access the vehicle under the first authorization policy. With reference to FIGS. 3, 4, and 6, the "first authorization policy" does not necessarily correspond to "Authorization Policy 1", but rather could correspond to any authorization policy as appropriate for a given application. In this sense, selection of the first authorization policy in act 804 refers to selecting an authorization policy which is appropriate for attempting authentication, from among a plurality of authorization policies (the stored first authorization policy and the at least one additional authorization policy).

Selection of the first authorization policy can be performed based on any appropriate data. In some implementations, the user-provided access key in 204 includes identification information used to select the first authorization policy. Such identification information could for example correspond to the user (e.g. indicate an identity or role of the user), or could directly indicate an authorization policy which the user-provided access key corresponds to (e.g. by indicating an authorization policy code). In other implementations, identification information (similar to as described above) is provided separately from the user-provided access key (e.g. as additional data transmitted with the user-provided access key, or as a separate message or communication from the user-provided access key).

In one example, such identification information could include an identity of the user, and the at least one processor 124 could select the first authorization policy based on the identity of the user. For example, each authorization policy could further include a respective list of users authorized under the authorization policy, and the at least one processor 124 can check the identity of the user against a list of users authorized under each authorization policy. An authorization policy for which the user is included in a corresponding list of authorized users can be selected as the first authorization policy, and the method proceeds to 206. Alternatively, the at least one non-transitory processor-readable storage medium 126 stores a list of users and their corresponding roles, and each authorization policy is specific to a respective role. The at least one processor 124 checks the role of the user based on the identity of the user, and then selects the first authorization policy as an authorization policy which corresponds to the role of the user.

In another example, such identification information could directly indicate a role of the user, and the at least one processor 124 selects the first authorization policy as an authorization policy which corresponds to the role of the user.

In yet another example, such identification information can indicate a corresponding authorization policy directly (e.g. by indicating an authorization policy code as mentioned above), and the at least one processor 124 selects the first authorization policy as an authorization policy corresponding to what is indicated.

In some implementations, in the event no authorization policy is selected as the first authorization policy in act 804, method 200 can still be executed, but skipping act 206 and proceeding to act 208 where use of the vehicle is denied to the user. In this way, attempts at authentication which are unlikely to succeed are reduced or prevented, which can save battery power at vehicle 120. In other implementations, in the event no authorization policy is selected as the first authorization policy in act 804, methods 200, 500, and/or 700 can still be executed, to attempt authentication under available authorization policies stored at the at least one non-transitory processor-readable medium 126. In this way, selection of authorization policy can be attempted for faster and more efficient authentication, but when such selection fails, more exhaustive attempts at authentication are performed to provide a more robust authentication system.

In some implementations, a plurality of Authorization Policies may include the same access key. With reference to the examples in FIGS. 3, 4, and 6, Access Key 1, Access Key 2, and Access Key 3 can comprise the same access key. In such an implementation, identification information is provided as discussed above (together with or separately from the User-Provided Access Key). Selection of authorization policy is then performed in accordance with method 800 in FIG. 8 based on the provided identification information.

After selecting an appropriate Authorization Policy, authentication is attempted as discussed with reference to method 200 in FIG. 2.

In some scenarios or implementations, any of the methods discussed herein can further comprise storing, by the at least one non-transitory processor-readable storage medium 126, an indication of at least one reservation of the vehicle 120. For example, the at least one processor 126 can store data indicating at least one future reservation of the vehicle 120, including time limits (beginning and end) of the at least one reservation, and an identity of the user or users for which the vehicle 120 is reserved. In some implementations, a single upcoming reservation is stored by the at least one non-transitory processor-readable storage medium 126. As needed, further reservations can be retrieved from or provided by network device 110. For example, when a user checks-in for a first reservation at vehicle 120, data for a subsequent second reservation can be retrieved (e.g. immediately, or at some point during the first reservation, such as when vehicle 120 has a stable network connection). In such implementations, storage space at non-transitory processor-readable medium 126 devoted to storing reservations is reduced. Further, communication burden for updating reservations is reduced, since only one reservation at vehicle device 122 will need to be updated in the event of changes to the reservation. On the other hand, reservation storage is less robust, in the event a next reservation is not or cannot be retrieved prior to said next reservation (for example if the vehicle 120 is not in a region with cellular connectivity). As such, in some implementations it is preferable to store a plurality of upcoming reservations at the at least one non-transitory processor-readable storage medium 126. Such a plurality of reservations could be a small number (e.g. two, three, four, five, as non-limiting examples). In other cases, the plurality of reservations could include an extensive schedule of reservations for a vehicle 120.

Figure 9:
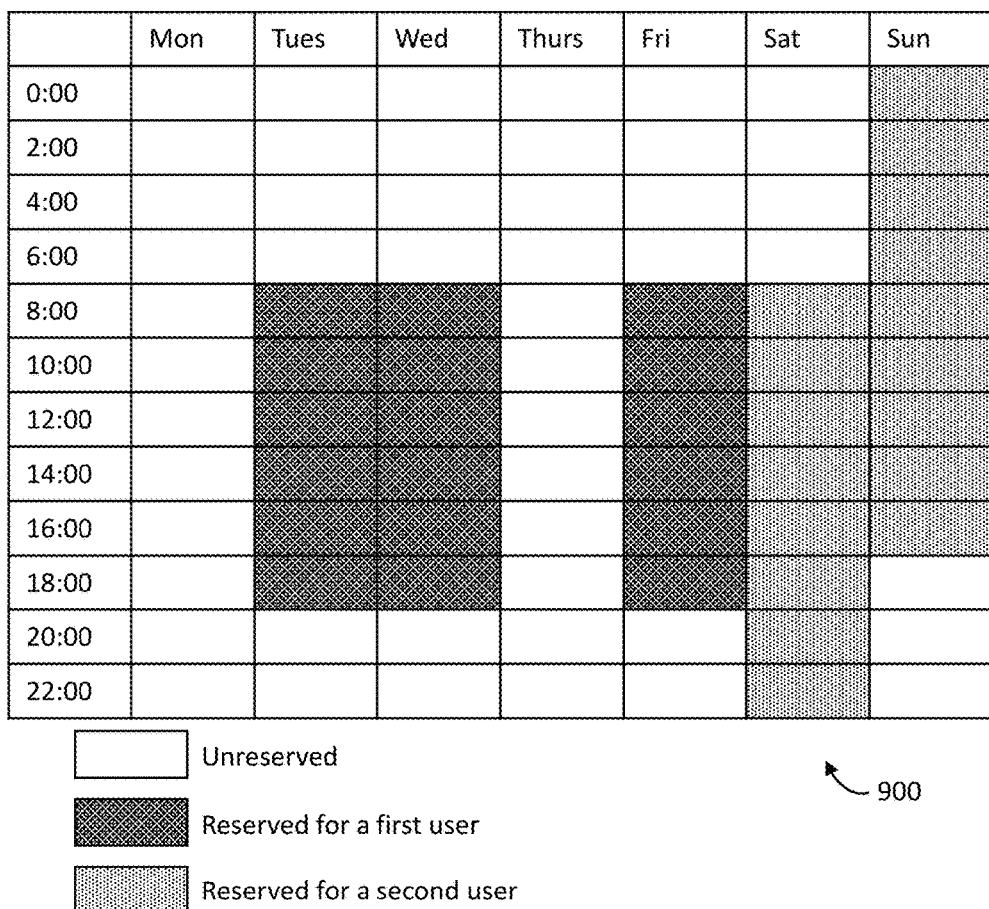
FIG. 9 is a calendar view of an exemplary reservation schedule.

FIG. 9 illustrates an exemplary reservation schedule 900, which could be stored at non-transitory processor-readable storage medium 126 at a vehicle device 122, and/or could be stored at non-transitory processor-readable storage medium 116 of network device 110. Schedule 900 illustrates reservations for one vehicle 120 for a one-week period, but a schedule can represent any length of period as appropriate for a given application. Further, schedule 900 illustrates time-blocks as two-hour intervals, but any appropriate intervals (or level of precision) for timing in a schedule could be implemented as appropriate for a given application. The example of FIG. 9 shows three reservations for a first user, on Tuesday, Wednesday, and Friday from 8:00 to 20:00. The example of FIG. 9 also shows a reservation for a second user from Saturday at 8:00 to Sunday at 18:00. The remaining time in schedule 900 is unreserved.

With reference to acts 214, 514, and 714 in methods 200, 500, and 700, authorization policies may require that vehicle 120 not be reserved by another user in order to allow a particular user to perform vehicle operations, or may require that vehicle 120 be reserved by the particular user attempting to perform vehicle operations, in order to perform said operations. As an example, with reference to schedule 900 in FIG. 9, if the first user were to attempt to access the vehicle 120 between Saturday 8:00 and Sunday 18:00, the first user may be authenticated (at 206, 506, or 706), but performing vehicle operations will be denied at 214, 514, or 714. Likewise, if the second user were to attempt to access the vehicle 120 between 8:00 and 20:00 on Tuesday, Wednesday, or Friday, the second user may be authenticated (at 206, 506, or 706), but performing vehicle operations will be denied at 214, 514, or 714. If, however, the first user or the second user were to try to perform vehicle operations outside of these reserved hours, they would be permitted (presuming authentication is successful, and there are not other requirements restricting performing of the vehicle operations). In some implementations, performing vehicle operations may also be denied in a buffer period prior to an upcoming reservation. For example, with reference to schedule 900, the second user may be denied in performing vehicle operations for a four-hour period prior to reservations of the first user, and the first user may similarly be denied in performing vehicle operations for a four-hour period prior to the reservation by the second user. This helps to prevent cases where a user takes a vehicle and doesn't not return it in time for another user's reservation. The example of a four-hour buffer is merely exemplary, and any appropriate length of buffer period could be implemented as appropriate for a given application.

In some applications, an authorization policy includes a requirement that a vehicle is reserved in order to allow a user to perform vehicle operations. In such applications, with reference to the example schedule 900, the first user would only be allowed to perform vehicle operations on Tuesday, Wednesday, and Friday from 8:00 to 20:00, whereas the second user would only be allowed to perform vehicle operations from Saturday 8:00 to Sunday 18:00.

In the methods discussed herein (e.g. method 200 in FIG. 2, method 500 in FIG. 5, and method 700 in FIG. 7), several acts involve interaction with a user in some form. For example, act 204 involves receiving a user-provided key. As another example, acts 210 involve receiving a user request to perform a user-requested vehicle operation. Such interaction can be performed in a variety of ways. Non-limiting examples include the user tapping an identification device (e.g. RFID or NFC device) to an identification device reader at a vehicle; the user engaging with components of a vehicle such as handles, ignition, knobs, or other controls; the user inputting information, codes, or keys in manually to an input device; or any other appropriate form of interaction. Another exemplary non-limiting form of interaction occurs through a user device capable of communication with a vehicle. Such a user device can comprise a smartphone, PDA, digital assistant, tablet, or any other appropriate form of user device. Such a user device can communicate with a vehicle by any appropriate form of communication, such as Bluetooth®, ZigBee®, Wifi®, cellular, or any other appropriate form of communication. FIGS. 10, 11, 12, 13, 14, 15, 16, 17, and 18 illustrate exemplary user interfaces for performing user interaction, as discussed below.

FIGS. 10, 11, 12, 13, 14, 15, 16, 17, and 18 illustrate user interface screens displayed on a user device (e.g. a smartphone) for accessing at least one vehicle and performing vehicle operations, in accordance with a non-limiting implementation. The illustrations of FIGS. 10, 11, 12, 13, 14, 15, 16, 17, and 18 are merely exemplary, and any appropriate user interface could be implemented on any appropriate device, as suitable for a given application. Further, additional interfaces screens could be added, interface screens could be removed, or interface screens could be reordered, as appropriate for a given application.

Figure 10:
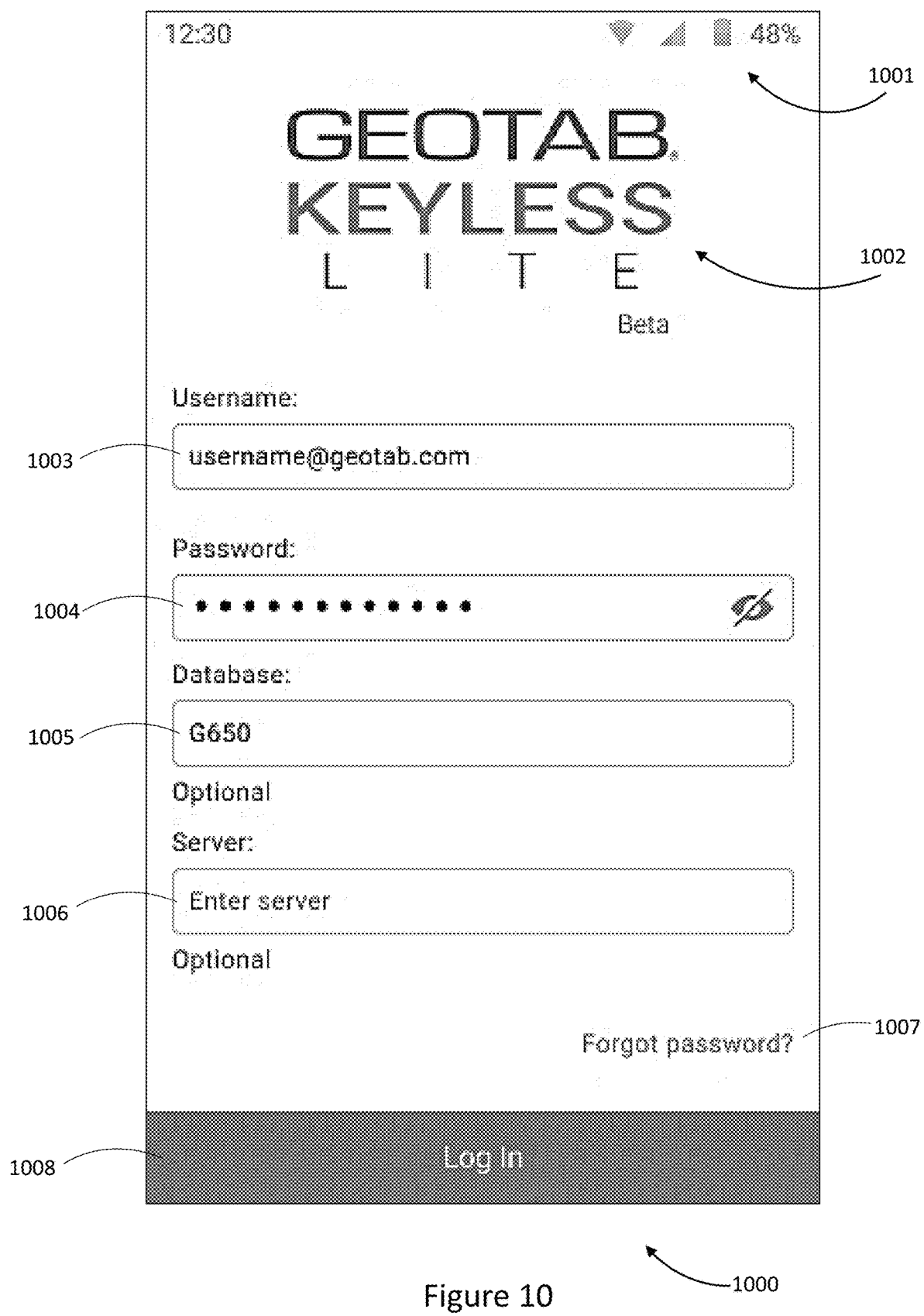
FIGS. 10, 11, 12, 13, 14, 15, 16, 17, and 18 are illustrations of exemplary user interfaces for interacting with a vehicle access system.

FIG. 10 illustrates an exemplary user login screen 1000. Login screen 1000 is optional, and a user could be automatically logged in and/or identifiable by virtue of using a particular user device assigned to the user. Login screen 1000 (and each of the other screens in FIGS. 11, 12, 13, 14, 15, 16, 17, and 18) are intended for display on a smartphone, and thus show smartphone status indicators 1001. The illustrated status indicators 1001 include a clock, WiFi® connectivity, Cellular Network connectivity, and battery level of the user device, though alternative or additional status indicators may be shown for a different user device. In some implementations, status indicators 1001 may not be present (for example if the user device is a different device). Login screen 1000 also shows an optional title field 1002 of the application, which can include any appropriate title or text ("Geotab Keyless Lite" in the illustrated example) and may include additional information such as application version ("Beta", in the illustrated example).

Login screen 1000 also shows a username input field 1003, filled with an email-address corresponding to a user. Username input field could take any appropriate user identifier, such as a user code or alias, as non-limiting examples. Login screen 1000 also shows a password input field 1004, which is filled with an obscured password for the user. Login screen 1000 also shows an optional database input field 1005, which is shown as filled with an exemplary database identifier. Any appropriate database identifier could be used, such as a database name or identifier code. Login screen 1000 also shows an optional server input field 1006, into which an exemplary server identifier could be input. Any appropriate server identifier could be used, such as a server name, or server identifier code, or server address, as non-limiting examples. Database input field 1005 and server input field 1006 are optional, and useful for selecting an appropriate fleet or connectivity server, as appropriate for a given application. An appropriate database or server could be associated with a user account, such that these fields can be automatically identified based on the user who is logging in.

Login screen 1000 also shows a password reset or retrieval option 1007, which can be used to help a user gain access if they forget their password. Login screen 1000 also shows a log in button 1008, which a user can click when the other fields of login screen 1000 have been filled. In response, the user is logged into the application.

FIG. 10 shows a number of input fields as being filled. Such filling of fields can optionally be automatic (e.g. the information is stored on a non-transitory processor-readable storage medium of the user device, and is automatically entered into corresponding fields of login screen 1000).

After logging in to the application, an interface for accessing vehicles is presented. Several different exemplary screens are illustrated in FIGS. 11, 12, 13, and 14, which show interfaces for identifying vehicles near the user device. To achieve this, the user device can connect with a network device (e.g. network device 110 in FIG. 1), and receive location data for at least one vehicle in a geographic location of interest to the user. In some scenarios, a geographic location of interest can be an area proximate the user (e.g. a radius around the user, or other shape defined around a location of the user). In other scenarios, a user could input a location of interest, such as by inputting an address of GPS position.

Figure 11:
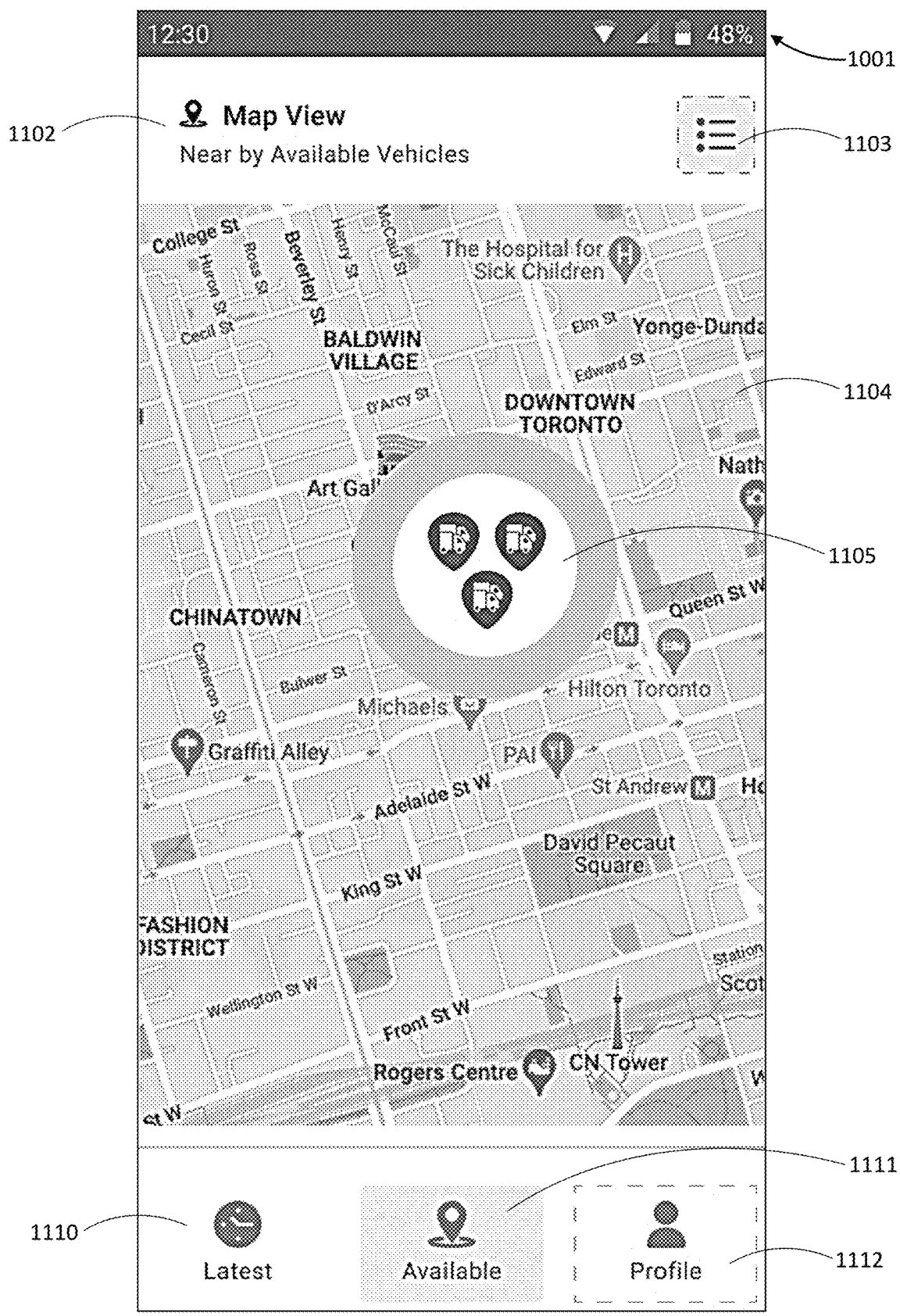
Figure 14:
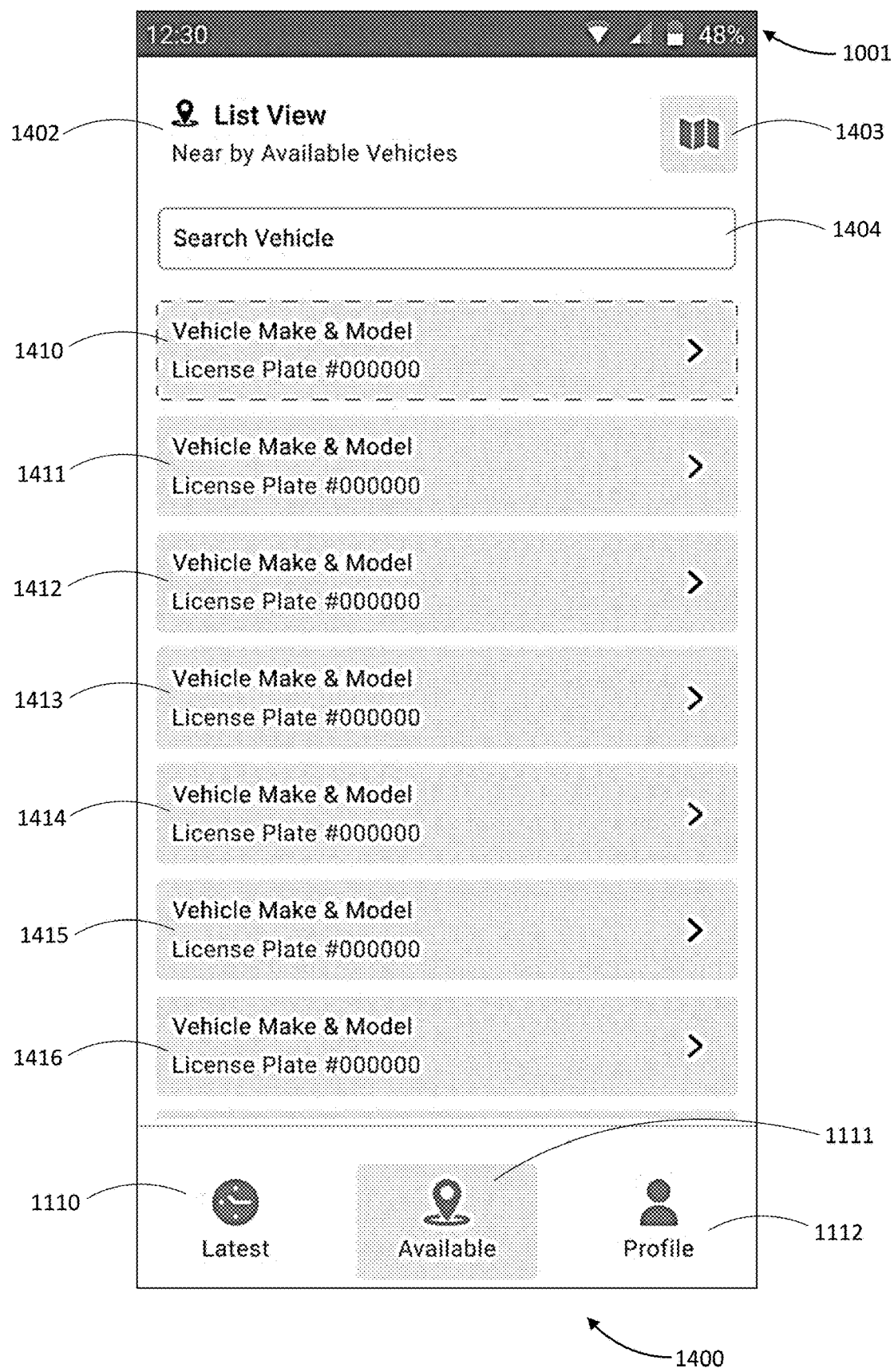

FIG. 11 shows a screen 1100. Screen 1100 is illustrated as including status indicators 1001 similar to screen 1000 of FIG. 10. Screen 1100 is also illustrated as including view indicator 1102, which indicates that screen 1100 is presenting a Map View showing nearby available vehicles in the illustrated example. Screen 1100 is also illustrated as including an options interface 1103, which could include options for adjusting the presented view (e.g., to change the view to a list view such as illustrated in FIG. 14, or to change how the map view is presented, as non-limiting examples).

Screen 1100 in FIG. 11 is also illustrated as including a map 1104 pertinent to the geographical area of interest. Over map 1104 is illustrated a collection of icons 1105, which illustrates that a plurality of vehicles are available in the geographic area of interest. The collection of icons 1105 can be positioned over a general area where said plurality of vehicles are, but each individual icon in the collection of icons 1105 does not exactly indicate a location of each individual vehicle in the plurality of vehicles. Collection of icons 1105 is particularly useful for showing a depot or parking location for a group of vehicles. This is because the location of each individual vehicle may not be accurate or important when said vehicles are generally positioned together. Further, collection of icons 1105 could be positioned proximate a convenient access point to the vehicles in the plurality of vehicles. For example, if the plurality of vehicles are positioned in a fenced parking lot, collection of icons 1105 could be positioned proximate a gate or opening in the fenced parking lot where a user would actually enter the parking lot. Collection of icons 1105 is illustrated as including three icons representing a vehicle, but any appropriate number of individual vehicle icons can be included in collection of icons 1105 as appropriate for a given application. In some implementations, the number of vehicle icons in collection of icons corresponds to a number of available vehicles (in the illustrated example, collection of icons 1105 includes three individual vehicle icons, indicating three available vehicles). In other applications, collection of icons 1105 includes a plurality of individual vehicle icons, indicating a plurality of vehicles available, but the quantity of individual vehicle icons does not necessarily correspond to the number of available vehicles. In the example of FIG. 11, three individual icons are illustrated, but this can represent any appropriate number of available vehicles, such as two vehicles, four vehicles, ten vehicles, or even more vehicles, as non-limiting examples. In yet other implementations, collection of icons 1105 includes a plurality of individual vehicle icons, but may only represent a location where a plurality of vehicles operate from, even if only a single vehicle is actually available.

Figure 16:
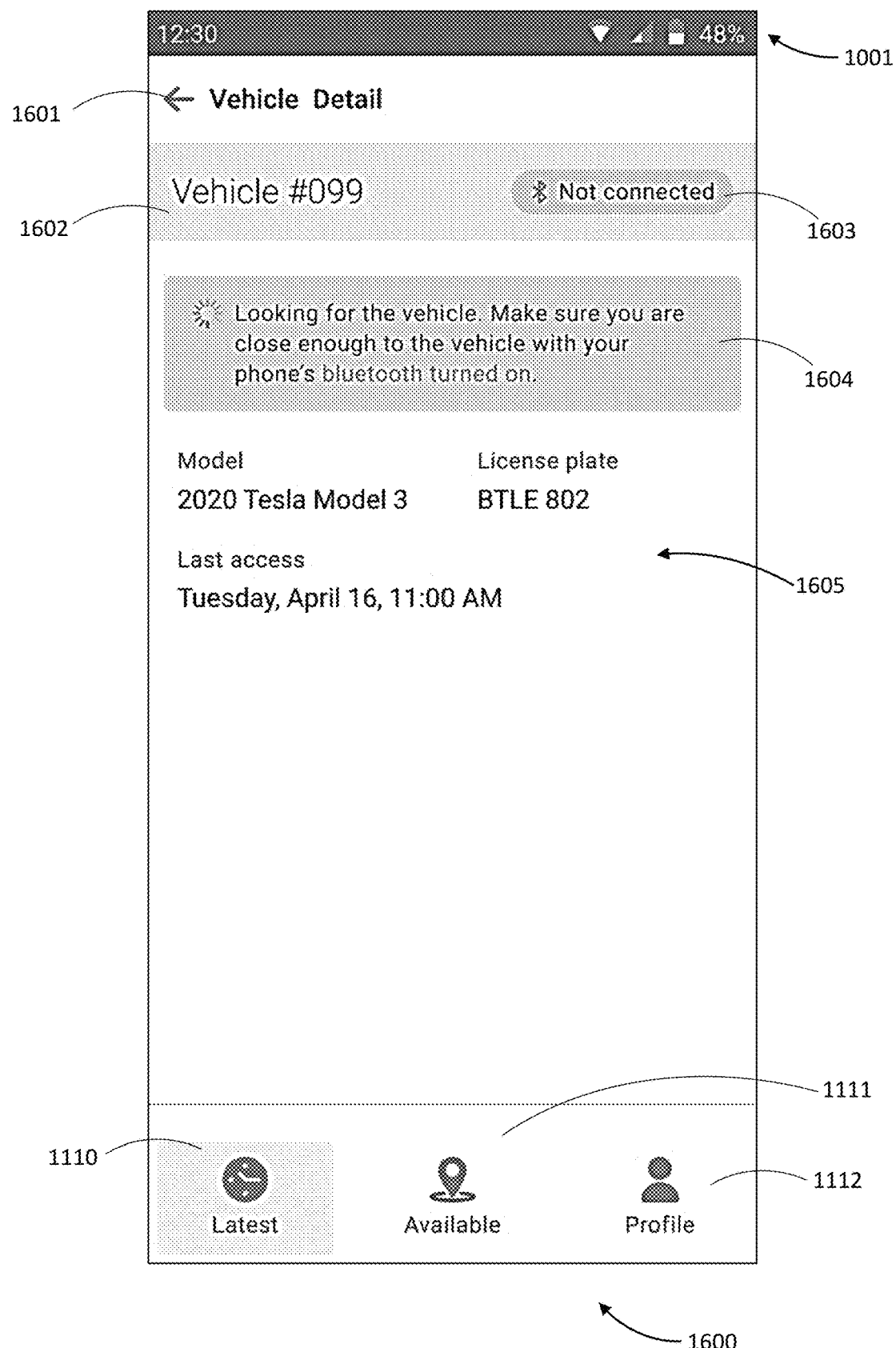
Figure 17:
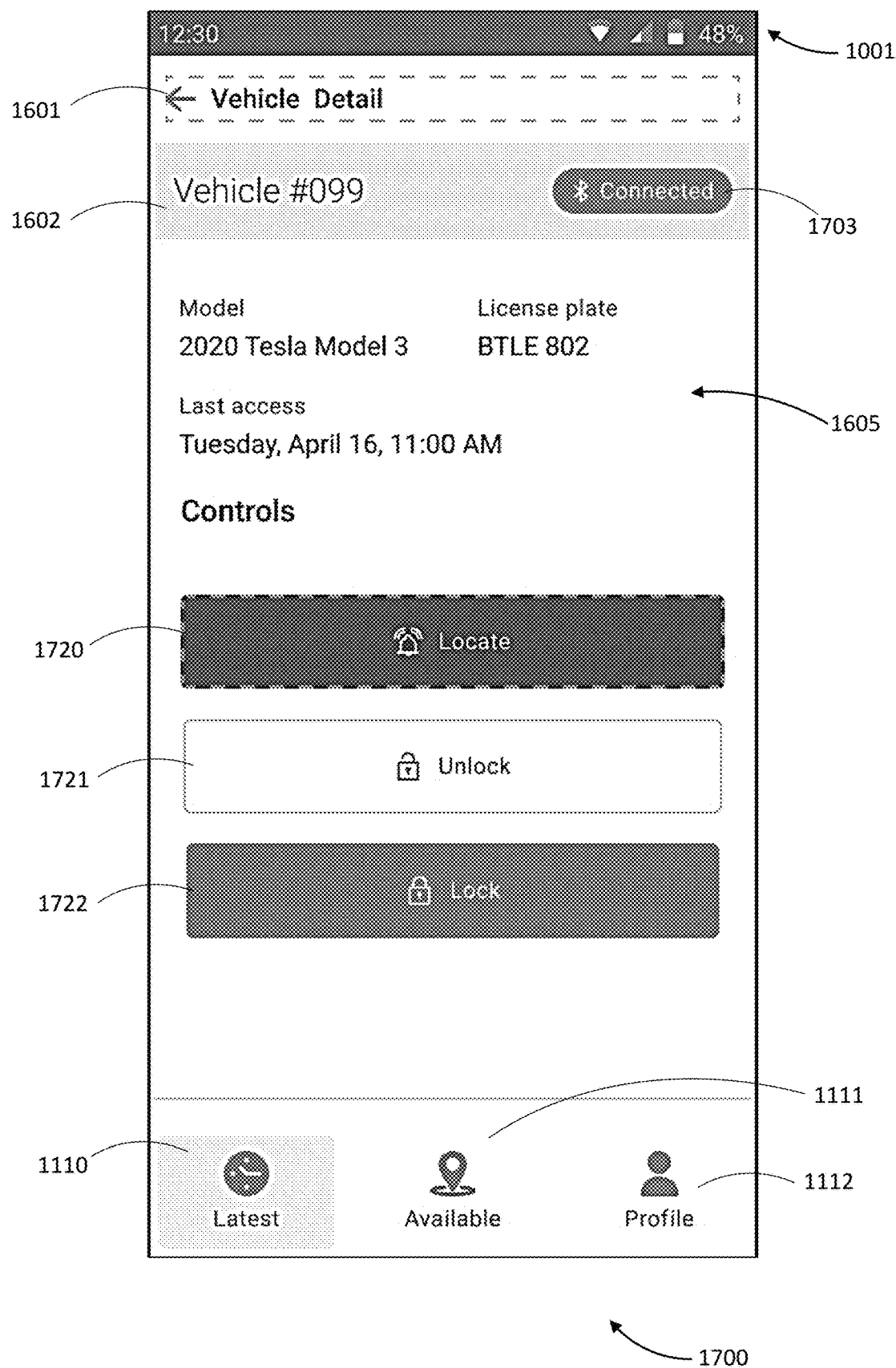
Figure 18:
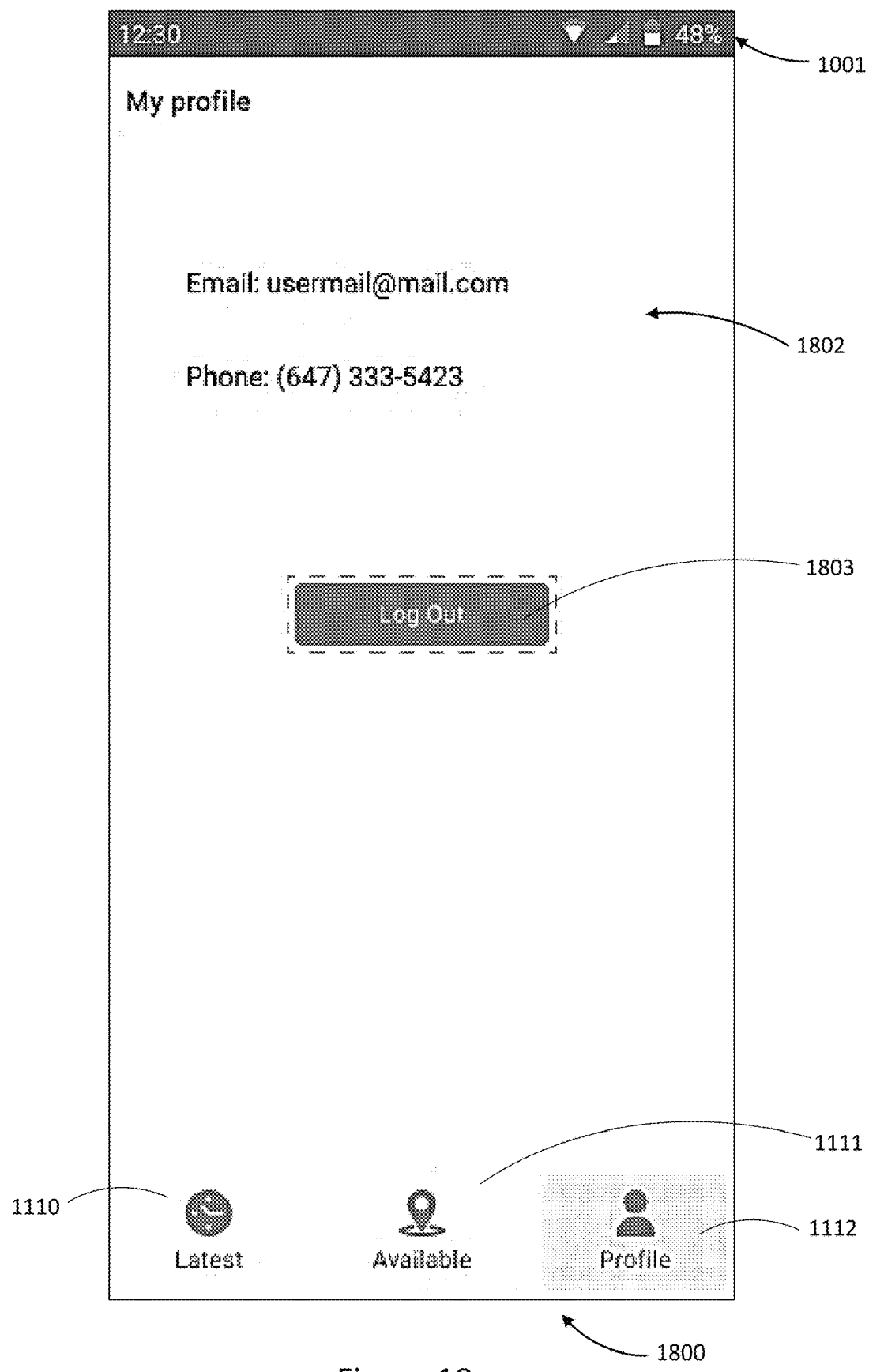

Screen 1100 in FIG. 11 is also illustrated as including interfaces 1110, 1111, and 1112 for selecting a desired interface screen to view. In the example illustrated in FIG. 11, interface 1111 is selected, corresponding to a screen for showing available vehicles. Interface 1110 can be selected to show a screen directed to a particular vehicle of interest or a most recently accessed vehicle (examples are shown in FIGS. 16 and 17). Interface 1112 can be selected to show a screen directed to profile information or settings of a user (an example is shown in FIG. 18).

Figure 12:
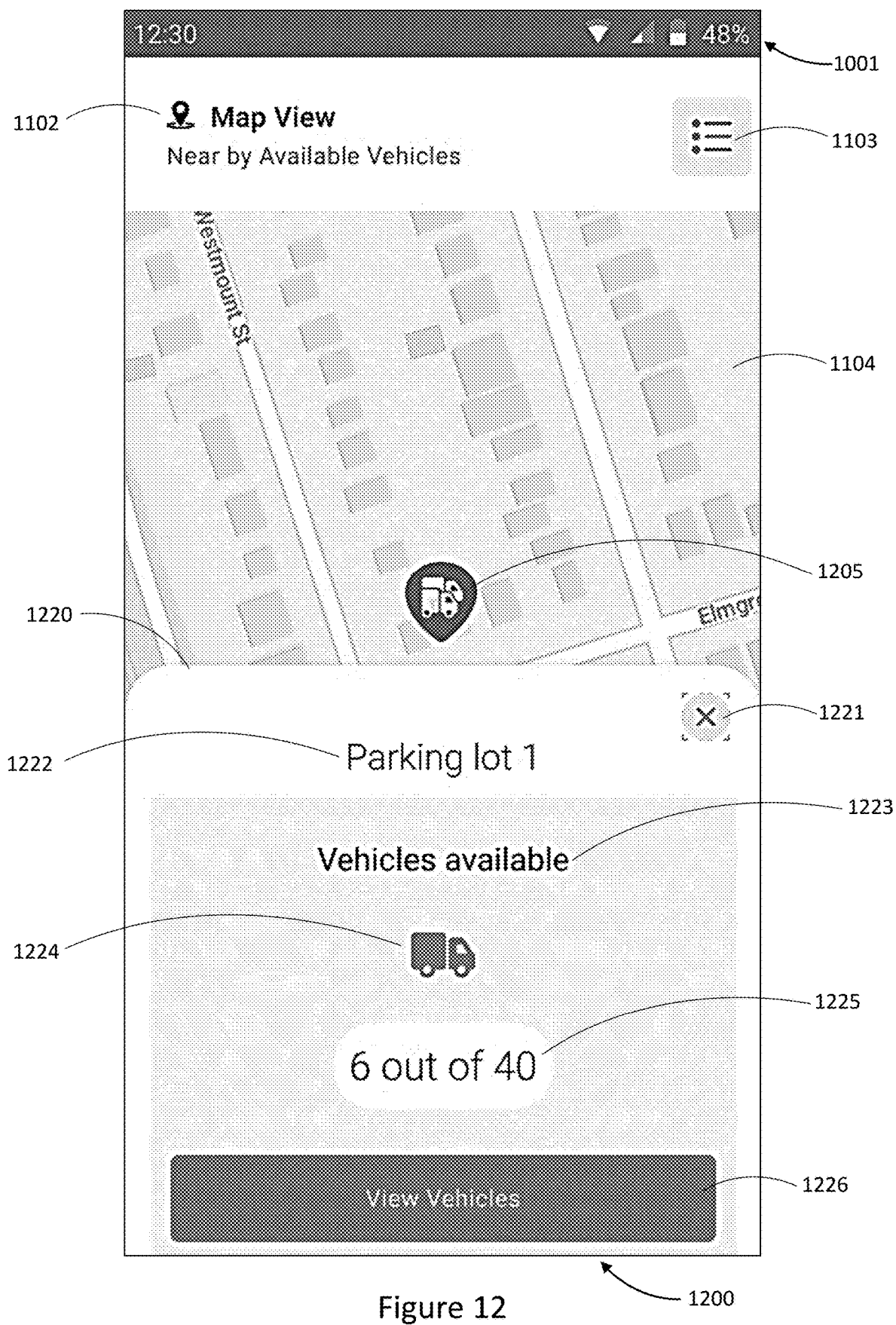

FIG. 12 shows a screen 1200. Screen 1200 is illustrated as including status indicators 1001 similar to screen 1000 of FIG. 10. Screen 1200 is also illustrated as including view indicator 1102, an options interface 1103, and a map 1104 similar to as described with reference to FIG. 11. Over map 1104 is illustrated an icon 1205 corresponding to a location where vehicles are based. Icon 1205 could also be represented as a collection of icons, similar to collection of icons 1105 in FIG. 11, if desired. In some implementations, icon 1205 indicates a location where available vehicles are generally located, even if no vehicles are actually available. In some implementations, icon 1205 is presented only if at least one vehicle is actually available at the location represented by icon 1205.

Screen 1200 in FIG. 12 is also illustrated as including a detailed view 1220 showing additional information regarding availability of vehicles at the location represented by icon 1205. View 1220 may initially be hidden from screen 1200, and may be presented in response to input from the user. For example, the user may click on or select icon 1205, and detailed view 1220 can pop up to provide additional information and/or options regarding the location corresponding to icon 1205. Detailed view 1205 could be closed or hidden from view by the user selecting close button 1221, or by the user clicking on or selecting map 1104 (such that close button 1221 is optional), as non-limiting examples. Detailed view 1220 is illustrated as including a title or description indicator 1222, which indicates identifying information of the location corresponding to icon 1205. Indicator 1222 could include as non-limiting examples: an address, a location name (corresponding to a physical sign at the location), a name of a landmark which can be used to identify the location, or any other appropriate identifier. Detailed view 1220 is also illustrated as including an indicator 1223 which states that vehicles are available at the location, and an indictor 1224 representing a type of vehicle available at the location (in the illustrated example, trucks), and an indicator 1225 showing how many (out of a total quantity) of vehicles are available at the location. Detailed view 1220 is also illustrated as including an interface 1226, which a user can click on or select in order to view specific vehicles at the location (such as for example in the format shown for screen 1400 illustrated in FIG. 14). The exact information presented in detailed view 1220 can be selected as appropriate for a given application, and not all of indicators 1222, 1223, 1224, or 1225 need be presented in every implementation.

Figure 13:
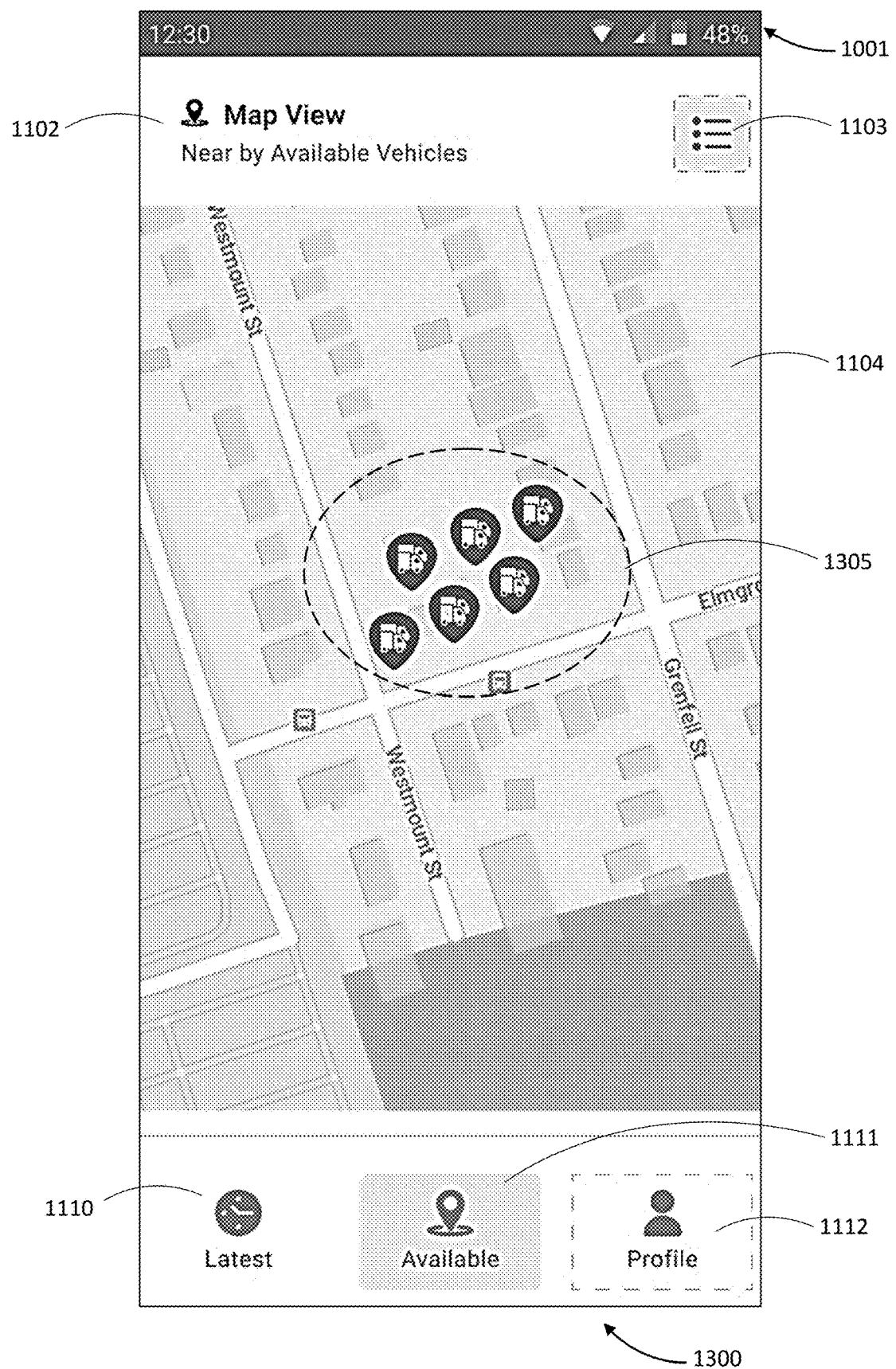

FIG. 13 shows a screen 1300. Screen 1300 is illustrated as including status indicators 1001 similar to screen 1000 of FIG. 10. Screen 1300 is also illustrated as including view indicator 1102, options interface 1103, map 1104, interface 1110, interface 1111, and interface 1112 as described with reference to screen 1100 in FIG. 11. Over map 1104 is illustrated a plurality of icons 1305, where each icon in the plurality of icons 1305 indicates an available vehicle. That is, compared to collection of icons 1105 in FIG. 11, the plurality of icons 1305 includes a respective icon for each available vehicle, corresponding to a location of said respective vehicle.

FIG. 14 shows a screen 1400. Screen 1400 is illustrated as including status indicators 1001 similar to screen 1000 of FIG. 10. Screen 1400 is also illustrated as including interface 1110, interface 1111, and interface 1112 similarly to as discussed with reference to FIG. 11.

Screen 1400 is also illustrated as including view indicator 1402, which indicates that screen 1400 is presenting a List View showing nearby available vehicles in the illustrated example. Screen 1400 is also illustrated as including view selection interface 1403, which could include options for adjusting the presented view (e.g., to change the view to a map view such as those illustrated in FIGS. 11, 12, and 13, as a non-limiting example).

Screen 1400 in FIG. 14 is also illustrated as including an optional search interface, for searching for specific vehicles based on text. As non-limiting examples, a user could input text corresponding to a desired vehicle or vehicle type (such as license plate number, vehicle type, vehicle capacity, vehicle accessories, vehicle color, vehicle model, or any other appropriate attributes). Available vehicles matching search criteria are presented in response to inputting said search criteria.

Screen 1400 in FIG. 14 is also illustrated as presenting a list of vehicles pertinent to the geographical area of interest and/or to input search criteria. In the illustrated example, the list of vehicles includes vehicles 1410, 1411, 1412, 1413, 1414, 1415, and 1416, though in other scenarios more or fewer vehicles could be included in the list as appropriate. The list of vehicles in screen 1400 is particularly useful for showing vehicles which can be identified based on text, for example if the user is standing amongst a plurality of available vehicles and can read the license plate numbers of said vehicles.

Figure 15:
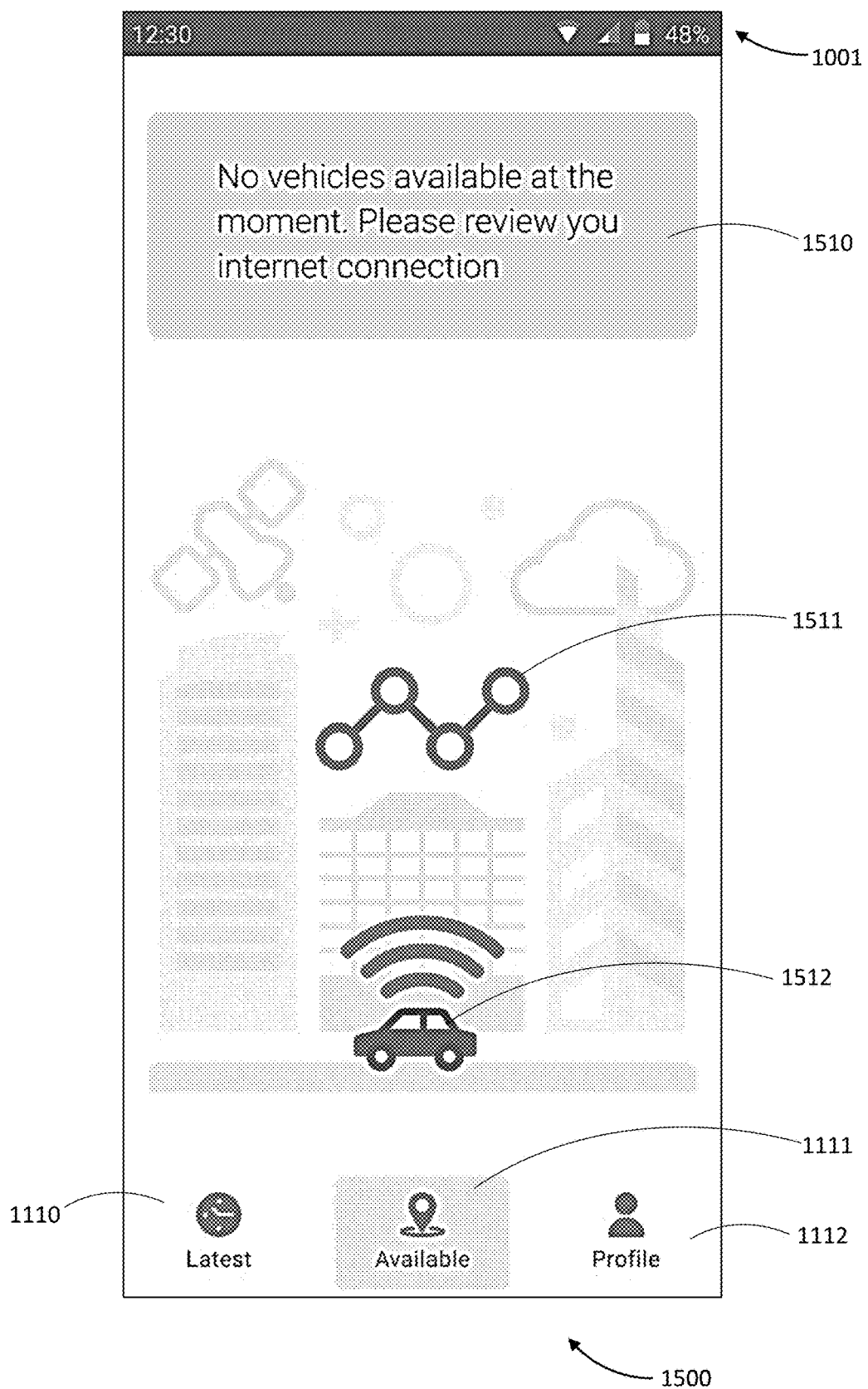

FIG. 15 shows a screen 1500. Screen 1500 is illustrated as including status indicators 1001 similar to screen 1000 of FIG. 10. Screen 1500 is also illustrated as including interface 1110, interface 1111, and interface 1112 similarly to as discussed with reference to FIG. 11. Screen 1500 is also illustrated as including indicators 1510, 1511, and 1512, which indicate that no available vehicles are found in the geographic region of interest. Indicator 1510 is a text indicator which explains that no available vehicles were found. Indicators 1511 and 1512 are graphical indicators which indicate wireless communication of a vehicle to a network. Any of indicators 1510 can be presented and used to indicate different reasons why no available vehicles are found, such as lack of internet connectivity of the user device attempting to identify vehicles, or due to a lack of vehicles being available in the geographic area of interest.

For any of the screens discussed with reference to FIGS. 11, 12, 13, 14, or any similar screen, a user selects a particular vehicle to access. In an exemplary implementation, at this stage acts 204 and 206 of method 200 in FIG. 2 are performed. In particular, the user device communicates with the selected vehicle and provides a user access key to the vehicle as in act 204. At least one processor at the selected vehicle then attempts to authenticate access to the vehicle for the user under an authorization policy stored at a non-transitory processor-readable storage medium at the vehicle as in act 206.

FIG. 16 illustrates an exemplary screen 1600 presented during acts 204 and/or 206, in an exemplary implementation. In the example of FIG. 16, screen 1600 is illustrated as including status indicators 1001 similar to screen 1000 of FIG. 10. Screen 1600 is also illustrated as including interface 1110, interface 1111, and interface 1112 similarly to as discussed with reference to FIG. 11, though in the example of FIG. 16, interface 1110 is selected indicating the "Latest" vehicle selected (in this case, the vehicle in which access is currently being attempted).

Screen 1600 in FIG. 16 is also illustrated as including an indicator 1601 which indicates the purpose of screen 1600 (to provide vehicle detail) and which further includes a back button for returning to a previous screen. Screen 1600 in FIG. 16 is also illustrated as including an indicator 1602 which shows an identifier for the vehicle. Such an identifier could be a vehicle name, license plate, description, or any other appropriate information which is useful to identify the vehicle.

Screen 1600 in FIG. 16 is also illustrated as including a status indicator 1603. Status indicator 1603 is illustrated as showing status of a Bluetooth® connection between the user device and a vehicle device in the vehicle (such as a vehicle device 122 in FIG. 1). Status indicator 1603 can be used to indicate more than just Bluetooth® connection status, but rather could indicate connection status by any appropriate communication protocol or pipeline. Further, Status indicator 1603 can also indicate authentication status. For example, if the vehicle device 122 is unable to authenticate the user at act 206 of method 200, act 506 of method 500, act 706 of method 700, or similar, status indicator 1603 can indicate such to the user (or can indicate "Not Connected", on the basis that an authenticated connection is not established, even if connection alone is possible).

Screen 1600 in FIG. 16 is also illustrated as including an optional detailed indicator 1604, which specifies what is presently being performed. In the illustrated example, this is "Looking for the vehicle", which can encompass identifying the vehicle to connect with, and attempting connection. Other detailed indications could be presented, such as "Establishing Connection", "Authenticating", or any other appropriate indication. Specificity (or inclusion) of detailed indication 1604 is chosen as appropriate based on a particular application.

Screen 1600 in FIG. 16 is also illustrated as including vehicle details 1605, which specify details pertaining to the selected vehicle. In the illustrated example, these details include model, license plate, and last access date and time of the vehicle.

FIG. 17 illustrates a screen 1700 presented in an exemplary implementation, after act 206 in method 200, act 506 in method 500, act 706 in method 700, or similar, where attempting to authenticate is successful. In the example of FIG. 17, screen 1700 is illustrated as including status indicators 1001 similar to screen 1000 of FIG. 10. Screen 1700 is also illustrated as including interface 1110, interface 1111, and interface 1112 similarly to as discussed with reference to FIG. 11, though in the example of FIG. 17, interface 1110 is selected indicating the "Latest" vehicle selected (in this case, the vehicle in which authentication is successful). Screen 1700 in FIG. 17 is also illustrated as including an indicator 1601, an indicator 1602, and vehicle details 1605 similarly to as discussed with reference to FIG. 16.

Screen 1700 in FIG. 17 is also illustrated as including a status indicator 1703. Status indicator 1703 in FIG. 17 is similar to status indicator 1603 in FIG. 16. One difference is that status indicator 1703 is illustrated as showing successful Bluetooth® connection between the user device and a vehicle device in the vehicle (such as a vehicle device 122 in FIG. 1). Similarly to as discussed with reference to FIG. 16, status indicator 1703 can be used to indicate more than just Bluetooth® connection status, but rather could indicate connection status by any appropriate communication protocol or pipeline. Further, status indicator 1703 can also indicate authentication status. For example, when the vehicle device 122 successfully authenticates the user at act 206 of method 200, act 506 of method 500, act 706 of method 700, or similar, status indicator 1703 can indicate such to the user (or can indicate "Connected", on the basis that an authenticated connection is established).

Screen 1700 in FIG. 17 is also illustrated as including user interfaces 1720, 1721, and 1722, which represent possible vehicle operations a user can request to perform. Interface 1720 corresponds to a "Locate" operation, where the user device presents a location of the vehicle, physically identifiable features of the vehicle, directions to the vehicle, or other similar operation which helps the user to physically find the vehicle. Interface 1721 corresponds to an "Unlock" operation, which unlocks doors or other access points of the vehicle. Interface 1722 corresponds to a "Lock" operation, which locks doors or other access points of the vehicle. Additional operations could be included, or operations could be removed, as appropriate for a given application.

In response to a user clicking on or selecting any of interfaces 1720, 1721, or 1722, acts 212, 214, 512, 514, 712, and/or 714 of respective methods 200, 500, or 700 are performed. That is, it is determined whether the authenticated user has permissions to perform the selected operation, and whether requirements are met for the operation to be performed. If the user is permitted to perform the selected vehicle operation, and requirements are met for the operation to be performed, then the operation is performed per act 216. If the user is not permitted to perform the selected vehicle operation, or requirements are not met for the operation to be performed, then the request to perform the operation is denied per act 218.

It is possible for a user to be authenticated to use a vehicle, but for no vehicle operations to be performable by the user under the circumstances (e.g. requirements to perform vehicle operations are not met). In an exemplary scenario, a first user is using a vehicle, and a second user who can be authenticated to use the same vehicle may wish to use the vehicle. If authentication were performed successfully and screen 1700 were presented to the second user, this would present the appearance that the vehicle is usable by the second user under the circumstances. Subsequently, however, the second user would try to perform vehicle operations, and would be denied. This would be frustrating to the second user. To address this, determining whether requirements to use a vehicle are met can be performed (at least to a limited extent) prior to presenting an option of vehicle access to the user. For example, prior to presenting the vehicle as "available" in any of screens 11, 12, 13, or 14, requirements to perform vehicle operations can be checked. If the requirements are not met, the vehicle is not presented as "Available". Whether and how such determining of whether requirements are met is performed can be based on a role of a user. In an exemplary scenario of a vehicle rental fleet, for customers who rent vehicles, determination of whether vehicle requirements are met is performed prior to presenting a vehicle as "Available". On the other hand, for service personnel who perform vehicle maintenance, determination of whether vehicle requirements are met may not be performed prior to presenting a vehicle as "Available", because such service personal may be required to service a vehicle is being used or is reserved for use.

Additionally, vehicle operations which a user is not permitted to perform may be excluded from screen 1700 in some implementations, or can be displayed but grayed out in other implementations.

FIG. 18 illustrates a screen 1800 presented in an exemplary implementation, when a user selects interface 1112 (or other "profile" option) in any other appropriate screen. Screen 1800 in FIG. 18 is illustrated as including status indicator 1001 similar to screen 1000 of FIG. 10. Screen 1800 is also illustrated as including interface 1110, interface 1111, and interface 1112 similarly to as discussed with reference to FIG. 11, though in the example of FIG. 18, interface 1112 is selected indicating the "Profile" page is selected. Screen 1800 in FIG. 18 is also illustrated as including user information 1802, and a "Log Out" button 1803. User information 1802 can include any appropriate information, and in the illustrated example include the user's email address and phone number. In the illustrated example, if a user selects log out button 1803, the user interface logs the user out and returns to screen 1000 illustrated in FIG. 10.

Figure 19:
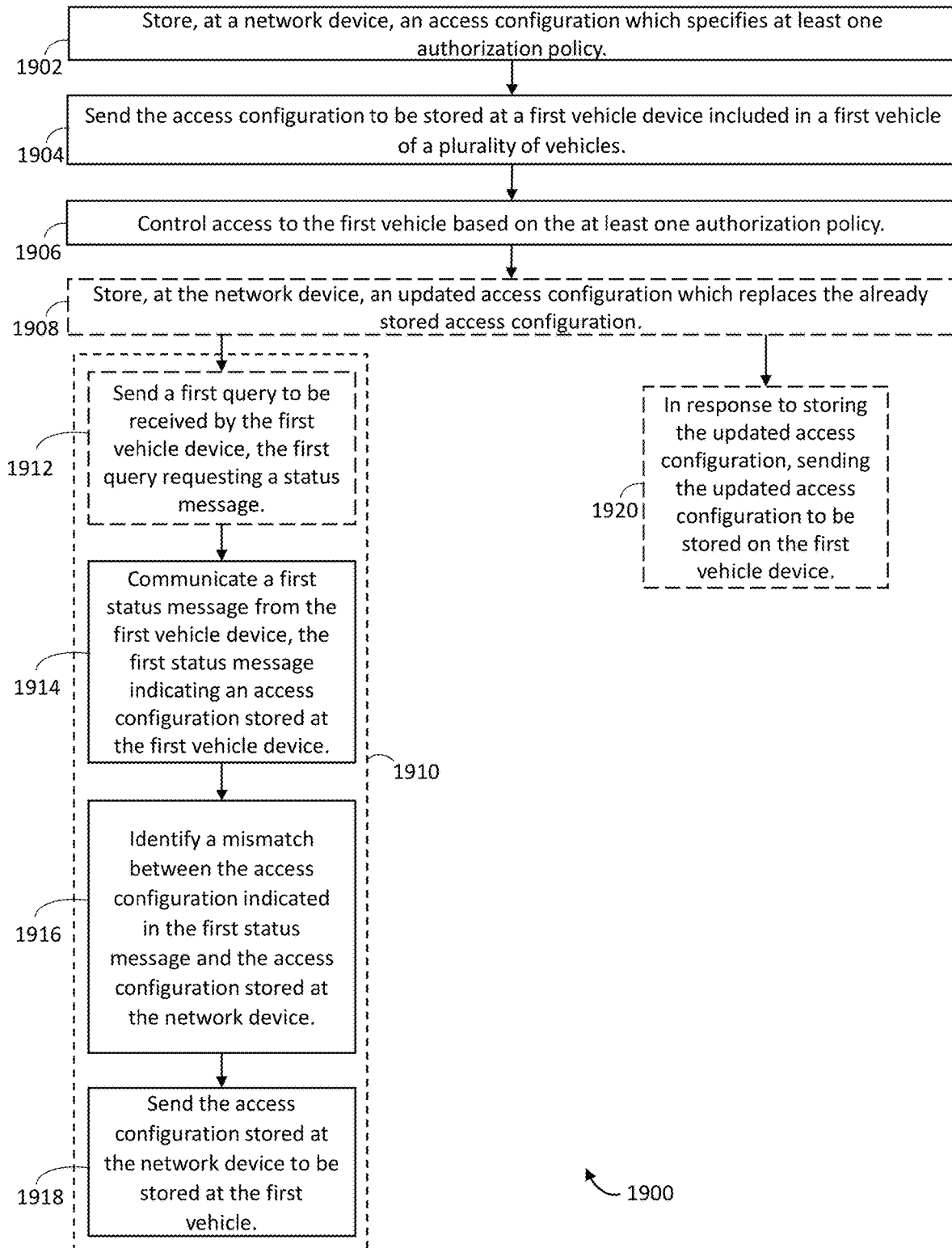
FIG. 19 is a flowchart diagram of a method for managing shared access to a plurality of vehicles, in accordance with an exemplary illustrated implementation.

FIG. 19 is a flowchart diagram which illustrates an exemplary method 1900 performed by devices such as those in FIG. 1. Method 1900 is generally directed towards managing access to a plurality of vehicles. Method 1900 as illustrated includes acts 1902, 1904, 1906, 1908, 1910, 1912, 1914, 1916, 1918 and 1920. Acts 1912, 1914, 1916, and 1918 are illustrated together as a collection of acts 1910. One skilled in the art will appreciate that additional acts could be added, acts could be removed, or acts could be reordered as appropriate for a given application. With reference to the example illustrated in FIG. 1, acts can be performed by appropriate components of network device 110 or vehicle devices 122. Further, any of the at least one non-transitory processor-readable storage mediums 116 or 126 could have instructions stored thereon, which when executed by a respective at least one processor (processors 114 or 124) cause the respective device (network device 110 or vehicle device 122) to perform a given act of method 1900. In the discussion of method 200 below, reference to an act being performed by at least one processor 124 refers to the act being performed by any of processors 124a, 124b, 124c, or 124d. Reference to an act being performed by at least one non-transitory processor-readable storage medium 126 refers to the act being performed by any of non-transitory processor-readable storage mediums 126a, 126b, 126c, or 126d. Reference to an act being performed by communication interface 128 refers to the act being performed by any of communication interfaces 128a, 128b, 128c, or 128d. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122a, 122b, 122c, or 122d (or any other similar vehicle device).

At 1902, an access configuration which specifies at least one authorization policy is stored at a network device (e.g., on the at least one non-transitory processor-readable storage medium 116 of network device 110). An access configuration can specify any appropriate number of authorization policies. In one exemplary implementation, an access configuration specifies the three authorization policies illustrated and discussed with reference to FIGS. 3, 4, and 6. The authorization policies within an access configuration can include any appropriate aspects, such as those discussed earlier with reference to FIGS. 3, 4, and 6, or those discussed later with reference to FIG. 20. In particular, each authorization policy of the at least one authorization policy includes a respective authorization scheme for authenticating an access key to access a vehicle in accordance with the authorization policy (similar to as discussed earlier with reference to FIGS. 3, 4, and 6); a respective indication of at least one vehicle operation which is permitted under the authorization policy (similar to as discussed earlier with reference to FIGS. 3, 4, and 6); and a respective indication of at least one vehicle access requirement to perform each of the at least one vehicle operation permitted under the authorization policy (similar to as discussed earlier with reference to FIGS. 3, 4, and 6).

At 1904, the access configuration is sent to be stored at a first vehicle device included in a first vehicle device of a plurality of vehicles. For example, with reference to the hardware of FIG. 1, communication interface 118 sends the access configuration stored on non-transitory processor-readable storage medium 116, to be received by communication interface 126a of a vehicle device 122a included in a vehicle 120a. The received access configuration is stored by at least one non-transitory processor-readable storage medium 126a of vehicle device 122a. Throughout the description of FIG. 19, the "first vehicle device" is discussed as vehicle device 122a in vehicle 120a in FIG. 1; however, the discussion is applicable to any appropriate vehicle device.

At 1906, access to the first vehicle 120a is controlled based on the at least one authorization policy. For example, the at least one processor 124a of vehicle device 122a controls access to the vehicle 120a based on at least one authorization policy included in the access configuration received and stored at 1904. Exemplary methodologies and techniques for controlling access to a vehicle based on at least one authorization policy are discussed above with reference to FIGS. 2, 5, and 7, and are fully applicable to act 1906 in method 1900.

Acts 1908, 1910 (including acts 1912, 1914, 1916, and 1918) and 1920 are optional acts generally directed to ensuring that an access configuration is properly stored at a vehicle device, including updating an access configuration as appropriate. Each of acts 1908, 1910 (including acts 1912, 1914, 1916, and 1918) and 1920 are not necessarily performed in a given scenario or implementation (though in certain circumstances, they may be). In particular, acts 1908, 1910 (including acts 1912, 1914, 1916, and 1918) and 1920 can be executed as appropriate to ensure correct storage or updating of an access configuration. Three exemplary implementations are discussed below regarding how select acts may be performed to achieve certain objectives.

In a first exemplary implementation, at 1908, an updated access configuration is stored at the network device 110 which replaces or supersedes the previously stored access configuration. For example, the access configuration stored at the at least one non-transitory processor-readable storage medium 116 is updated to a new access configuration. In some cases, the updated access configuration "replacing" or "superseding" a previously stored access configuration can refer to the previously stored access configuration being deleted, and the updated access configuration being stored instead. In other cases, "replacing" or "superseding" a previously stored access configuration refers to the existing access configuration as stored being modified to the updated access configuration without retaining the pre-update access configuration. However, this is not necessarily the case. For example, in some cases the updated access configuration "replacing" or "superseding" an previously stored access configuration can refer to the previously stored access configuration being archived, outdated, or similar (i.e., retained on non-transitory processor-readable storage medium 116, but not as the most up-to-date version), and the updated access configuration being stored as well (as the most up-to-date version). In this way, if appropriate, an old access configuration could be accessed and/or utilized if needed or appropriate.

Collection of acts 1910 is generally directed to determining when to send an access configuration to a vehicle, based on a status message from a vehicle device in the vehicle. Collection of acts 1910 is optional in the context of method 1900 as mentioned above. Collection of acts 1910 as illustrated includes acts 1912, 1914, 1916, and 1918.

At 1912, a first query is sent to be received by the first vehicle device, where the first query requests a status message from the first vehicle device (for example, communication interface 118 sends a first query to a first vehicle device 122a). Act 1912 is further optional within optional collection of acts 1910, as discussed later.

At 1914, a first status message is sent by the first vehicle device, and received by the network device (communicated from the first vehicle device to the network device). The first status message indicates an access configuration stored at the first vehicle device. In an example, the at least one processor 124a of vehicle device 122a can prepare the first status message, which is sent by communication interface 128*a*, and is received by communication interface 118 of network device 110. The first status message (or other appropriate similar status messages discussed herein) can indicate a version number of an access configuration, or could be a hash corresponding to the access configuration, as non-limiting examples.

At 1916, a determination is made as to whether there is a mismatch between the access configuration indicated in the first status message and the access configuration stored at the at least one non-transitory processor-readable storage medium of the at least one network device. For example, the at least one processor 114 can compare the indication of the access configuration in the first status message to information about the access configuration stored at non-transitory processor-readable storage medium 116, to determine whether there is a mismatch. For example, if a version number of the access configuration stored at the first vehicle device 122*a* (as received in the first status message) does not match a version number of the access configuration stored at the network device 110, a mismatch is identified. As another example, if a hash corresponding to the access configuration stored at the first vehicle device 122*a* (as received in the first status message) does not match a hash corresponding to the access configuration stored at the network device 110, a mismatch is identified.

Upon identification of a mismatch at 1916, method 1900 proceeds to 1918, where the access configuration stored at the network device is sent to be stored at the first vehicle device. For example, communication interface 118 can send the access configuration stored at non-transitory processor-readable storage medium 116 to be received by communication interface 128*a* and stored at non-transitory processor-readable storage medium 126*a* of vehicle device 122*a*. Because an updated access configuration was stored at 1908, which replaces or supersedes an previously stored access configuration, the access configuration which is sent at 1918 is the updated access configuration.

If a mismatch is not identified at 1916, act 1918 is not performed.

The first exemplary implementation discussed above is particularly useful for managing updates to access configurations; however, act 1908 is optional. In a second exemplary implementation, act 1908 is not performed (that is, the access configuration stored at the network device 110 is not updated since being stored at 1902). Even though this stored access configuration is sent to the first vehicle device at 1904, it can be useful to still perform collection of acts 1910, as discussed below.

In this second exemplary implementation, acts 1912, 1914, 1916, and 1918 are performed similarly to as discussed above regarding the first exemplary implementation. One difference however, is that the access configuration stored at the network device which is checked for mismatch at 1916, and the access configuration sent to be stored at the first vehicle at 1918, are the access configuration stored at 1902 (not an updated access configuration as in act 1908 which is not performed in this example).

In this sense, the access configuration sent to be stored at the first vehicle device at 1904, and the access configuration sent to be stored at the first vehicle device at 1918, should be the same access configuration. Thus, this second exemplary implementation is an effective means of confirming that the access configuration sent to the first vehicle device is correctly received and stored at the first vehicle device. The second exemplary implementation also effectively confirms whether the access configuration stored at the vehicle device has not been altered, corrupted, or deleted. If the access configuration stored at vehicle device 122*a* is compromised (i.e. a mismatch is identified at 1916), the access configuration is resent at 1918.

Both the first exemplary implementation and the second exemplary implementation discussed above include act 1912 of sending a first query requesting the first status message. However, this act 1912 is optional in both implementations. For example, instead of sending the first query, the vehicle device 122*a* (or processor 124*a* thereof) can prepare and send the first status message on a regular or periodic basis, to be received by the network device 110 as in 1914. In this way, the vehicle device performs a regular status report, which the network device uses to determine if the access configuration stored at the first vehicle is out-of-date or otherwise improper or inaccurate.

Further still, sending of the first query at 1912 as in the first and second exemplary implementations discussed above can be performed on a regular or periodic basis. That is, the network device 110 can request a regular status update from the first vehicle 122*a*, to determine whether the access configuration stored at the first vehicle 122*a* is out-of-date or otherwise improper or inaccurate.

In a third exemplary implementation, acts 1908 and 1920 are performed.

At 1908, an updated access configuration is stored at the network device 110, similarly to as discussed above regarding the first exemplary implementation. At 1920, in response to storing the updated access configuration at 1908, the updated access configuration is sent to be stored on the first vehicle device 122*a*. For example, communication interface 118 of network device 110 sends the updated access configuration to be received by communication interface 128*a*, and stored at the at least one non-transitory processor-readable storage medium 126*a* of vehicle device 122*a*.

The third exemplary implementation is effective at automatically updating the access configuration stored at the first vehicle device 122*a*, in response to the access configuration stored at the network device 110 being updated.

The first, second, and third exemplary implementations discussed above are not necessarily exclusive to each other. For example, the second exemplary implementation can be performed to confirm correct storing or maintenance of an original access configuration sent from the network device to the first vehicle device. The third exemplary implementation can then be performed in response to an updated access configuration being stored at the network device. Then, the second exemplary implementation can be performed to confirm correct storing or maintenance of the updated access configuration at the first vehicle device.

In any of the above discussed exemplary implementations, a confirmation message can optionally be sent from the first vehicle device confirming that the sent access configuration was received by the first vehicle device. For example, at 1904, the first vehicle device 122*a* receives the access configuration sent from the network device 110, and in response the first vehicle device 122*a* sends a confirmation message to the network device 110 indicating that the access configuration was received. If network device 110 does not receive this confirmation message, network device 110 resends the access configuration at 1902. Similar discussion is applicable to sending of the access configuration at 1918. In such cases where a confirmation message is used to confirm whether the access configuration is correctly received, collection of acts 1910 is still useful for determining whether an access configuration stored at the first vehicle device 122*a* is correctly maintained (e.g. not corrupted or deleted, and kept up-to-date).

Figure 20:
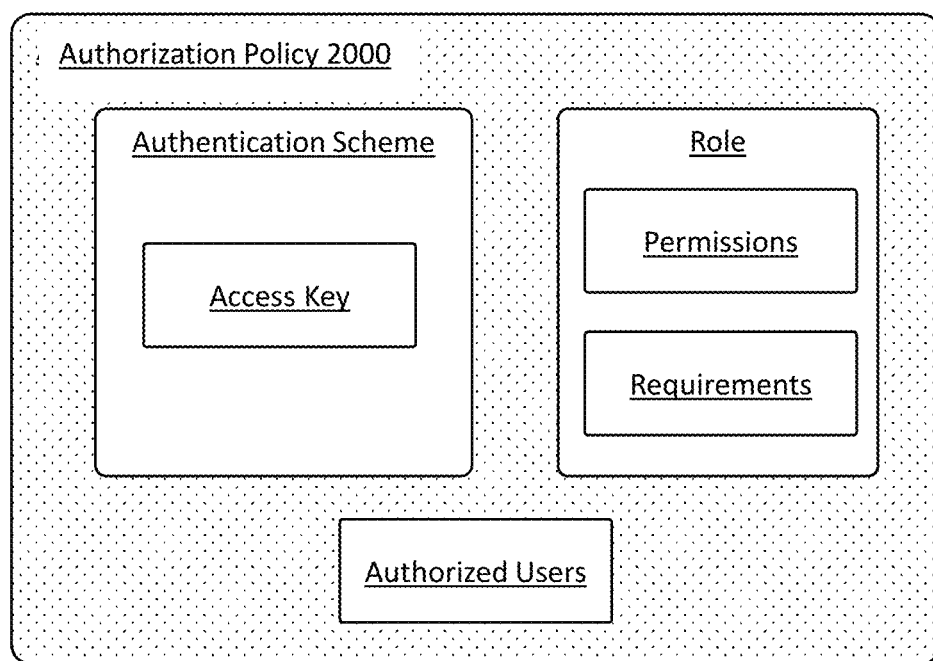
FIG. 20 is a schematic diagram of an exemplary authorization policy.

Several mentions are made above regarding an access configuration being "updated", which can include many forms of updates. For example, an updated access configuration can include an update or updates to at least one, a plurality, or all authorization policies included in the access configuration. FIG. 20 illustrates an exemplary authorization policy 2000, to show elements of the authorization policy which can be updated. Similar disclosure also applies to the authorization policies discussed with reference to FIGS. 3, 4, and 6.

FIG. 20 shows Authorization Policy 2000 as including an Authentication Scheme, which includes an Access Key for authenticating users. An update to an authorization policy could include an updated authentication scheme for the policy, such as an update to an access key or access keys that can be authenticated by the authentication scheme.

Authorization policy 2000 is also shown as including Permissions (indication of at least one vehicle operation which is permitted under the Authorization Policy). An update to an authorization policy can include an updated indication of at least one indication of at least one vehicle operation which is permitted under the authorization policy (e.g. permitted operations could be added or removed from the authorization policy).

Authorization policy 2000 is also shown as including Requirements (indication of at least one vehicle access requirement to perform each vehicle operation permitted under the Authorization Policy). An update to an authorization policy could include an updated indication of at least one vehicle access requirement (e.g. updating conditions needed to be fulfilled in order to perform certain vehicle operations, such as updating reservation information).

Authorization Policy 2000 is also shown as including a list of Authorized Users (at least one Authorized User), who are authorized to access vehicles in the plurality of vehicles managed by any of the methods discussed herein (including methods 200, 500, 700, 1900, and 2100). This list of Authorized Users can thus be stored on at least one non-transitory processor-readable storage medium of vehicle devices 122 or of network device 110 (i.e. on non-transitory processor-readable storage mediums 116 and/or 126). When authenticating a user to access a vehicle, said user can be authenticated not only by authenticating a user-provided access key against an access key included in an authentication scheme, but also by receiving an identification or credentials of the user and checking whether the user is included in the authorized list of users for the authorization policy. In this way, even if a user has an authentic access key, they may still be denied vehicle access if they are not included in a list of authorized users. For example, a user may have a valid access key stored on a device (e.g. an identification device or a user device), but their access may have been revoked by removing them from a list of authorized users, such that they will not be granted vehicle access. In this sense, an updated authorization (e.g. as part of an updated access configuration) can include an updated list of at least one user authorized to access vehicles in the plurality of vehicles (e.g. by removing or adding authorized users).

Figure 21:
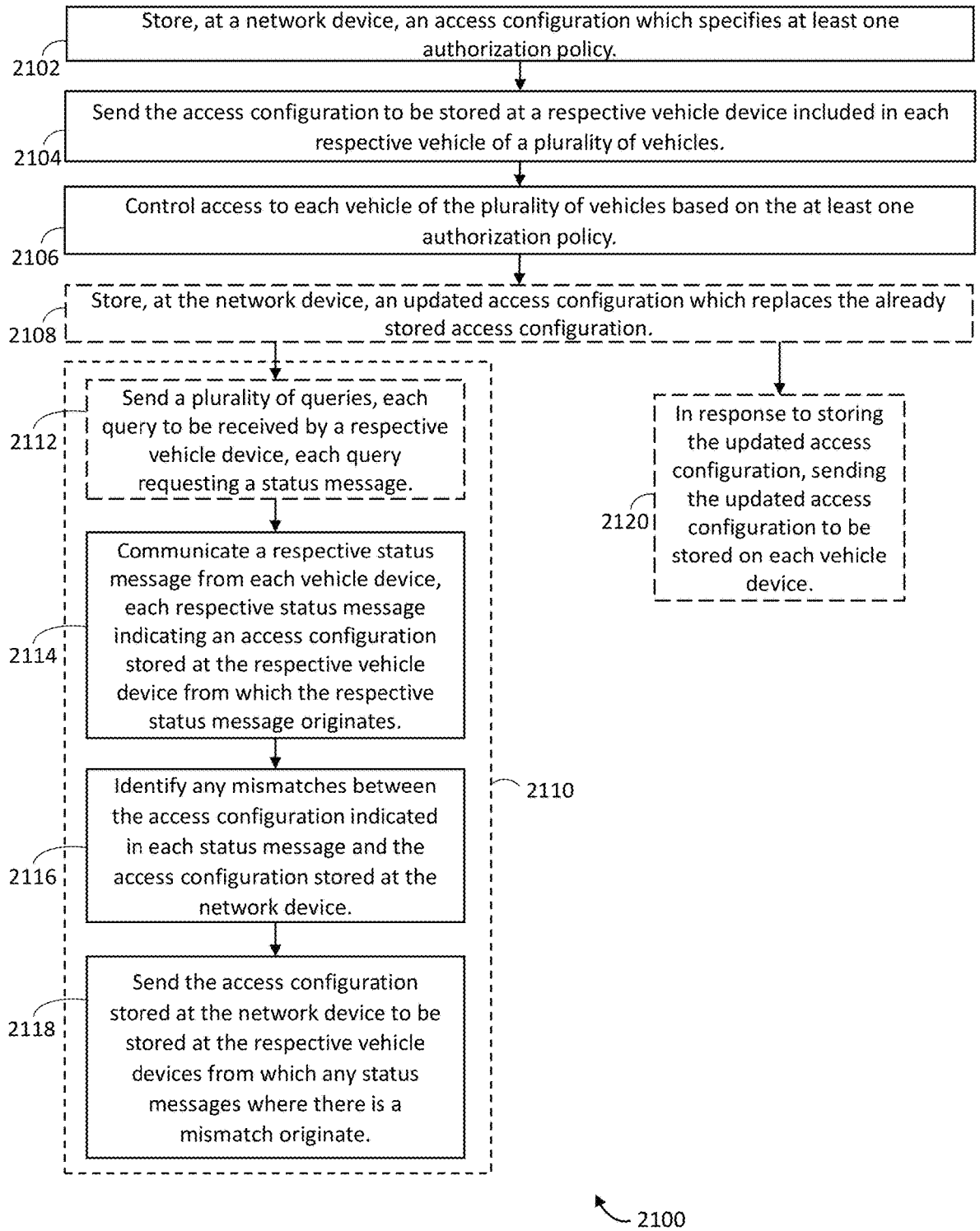
FIG. 21 is a flowchart diagram of a method for managing shared access to a plurality of vehicles, in accordance with another exemplary illustrated implementation.

FIG. 21 is a flowchart diagram which illustrates an exemplary method 2100 performed by devices such as those in FIG. 1. Method 2100 is in some ways similar to method 1900 discussed with reference to FIG. 19, and description of method 1900 also applies to method 2100 unless context dictates otherwise. For example, acts of method 2100 are performed by hardware similarly to as described with reference to method 1900. Method 2100 as illustrated includes acts 2102, 2104, 2106, 2108, 2110, 2112, 2114, 2116, 2118 and 2120. Acts 2112, 2114, 2116, and 2118 are illustrated together as a collection of acts 2110. One skilled in the art will appreciate that additional acts could be added, acts could be removed, or acts could be reordered as appropriate for a given application.

Method 2100 is a generalized method similar to method 1900. That is, while method focuses on managing an access configuration on a first vehicle device, method 2100 is directed to managing an access configuration on a plurality of vehicle devices. In a sense, method 1900 can be considered as an aspect of method 2100, in that method 1900 describes acts performed for one vehicle of a plurality of vehicles, while method 2100 pertains to similar acts for each vehicle of the plurality of vehicles.

At 2102, an access configuration which specifies at least one authorization policy is stored at a network device (e.g. on at least one non-transitory processor-readable storage medium 116 of network device 110 in FIG. 1). Description of act 1902 in method 1900 is applicable to similar act 2102 in method 2100, and is not repeated for brevity.

At 2104, the access configuration stored at the network device is sent to be stored at a respective vehicle device included in each respective vehicle of a plurality of vehicles. For example, with reference to the hardware of FIG. 1, communication interface 118 sends the access configuration stored on non-transitory processor-readable storage medium 116, to be received by communication interfaces 126 of a plurality of vehicle devices 122 included in a plurality of vehicles 120. The received access configuration is stored by a respective at least one non-transitory processor-readable storage medium 126 of each vehicle device 122. Description of similar act 1904 in method 1900 is applicable to act 2104 in method 2100. In a sense, act 2104 can be considered an extension of act 1904. That is, at 1904 the access configuration is sent to be stored at a first vehicle device 122a included in a first vehicle 120a of a plurality of vehicles, and act 2104 extends this such that the access configuration is additionally sent to be stored on a respective non-transitory processor-readable storage medium of each respective vehicle device (122b, 122c, and 122d) included in each other vehicle (120b, 120c, and 120d) of the plurality of vehicles in addition to the first vehicle 120a.

At 2106, access to each vehicle of the plurality of vehicles is controlled based on the at least one authorization policy, by the respective vehicle device in each vehicle. For example with reference to the hardware in FIG. 1, each vehicle device 122 controls access to a respective vehicle 120 in which the vehicle device 122 is included, based on the at least one authorization policy. Description of similar act 1906 in method 1900 is applicable to act 2106 in method 2100. In a sense, act 2106 can be considered an extension of act 1906. That is, at 1906 access to the first vehicle 120a is controlled by the first vehicle device 122a included in the first vehicle 120a, and act 2106 extends this such that access to each other vehicle of the plurality of vehicles (120b, 120c, and 120d) in addition to the first vehicle (120a) is controlled, by the respective vehicle device (122b, 122c, and 122d) included in each vehicle of the plurality of vehicles, based on the at least one authorization policy stored on the non-transitory processor-readable storage medium of the respective vehicle device.

At 2108, an updated access configuration which replaces or supersedes the previously stored access configuration is (optionally) stored at the network device (e.g. on at least one non-transitory processor-readable storage medium 116 of network device 110 in FIG. 1). Description of act 1908 in method 1900 is applicable to similar act 2108 in method 2100, and is not repeated for brevity.

At 2120, in response to storing the updated access configuration at 2108, the updated access configuration is sent to be stored on each vehicle device (e.g. the at least one communication interface 118 of network device 110 sends the updated access configuration to each vehicle device 122, to be received by each respective communication interface 128 and stored at each respective non-transitory processor-readable storage medium 126). Description of similar act 1920 in method 1900 is applicable to act 2120 in method 2100. In a sense, act 2120 can be considered an extension of act 1920. That is, at 1920 the updated access configuration is sent to be stored on a first vehicle device, and act 2120 extends this such that the updated access configuration is sent to be stored on each other vehicle device (122b, 122c, and 122d) in addition to the first vehicle device (122a).

At 2112, a plurality of queries are sent (e.g. by the communication interface 118 of network device 110). Each query is to be received by a respective vehicle device, and each query requests a status message from the respective vehicle device. Description of similar act 1912 in method 1900 is applicable to act 2112 in method 2100. Act 2112 is optional, for the reasons discussed above regard act 1912. In a sense, act 2112 can be considered an extension of act 1912. That is, at 1912 a first query is sent to be received by a first vehicle device 122a, and act 2112 extends this such that a plurality of queries are sent to be received by each other vehicle device (122b, 122c, and 122d) in addition to the first vehicle device (122a).

At 2114, a respective status message is sent by each vehicle device, and received by the network device (a respective status message is communicated from each vehicle device to the network device). Each respective status message indicates an access configuration stored at the respective vehicle device from which the respective stats message originates. Description of similar act 1914 in method 1900 is applicable to act 2114 in method 2100. In a sense, act 2114 can be considered an extension of act 1914. That is, at 1914 a first status message is prepared and sent from a first vehicle device 122a, to be received by network device 110, which indicates an access configuration stored at the first vehicle device 122a; act 2114 extends this such that a plurality of status messages are prepared and sent from each other vehicle device (122b, 122c, and 122d) in addition to the first vehicle device (122a), which indicate an access configuration of each vehicle device (122b, 122c, and 122d) in addition to the first vehicle device (122a), to be received by network device 110.

At 2116, any mismatches between the access configuration indicated in each status message and the access configuration stored at the network device are identified. That is, for each status message (or vehicle device), a determination is made as to whether the access configuration indicated in the status message (i.e. access configuration stored at the vehicle device) matches the access configuration stored at the network device (or the updated access configuration if applicable from act 2108). Description of similar act 1916 in method 1900 is applicable to act 2116 in method 2100. In a sense, act 2116 can be considered an extension of act 1916. That is, at 1916 a mismatch between an access configuration indicated in a first status message received from a first vehicle device 122a and an access configuration stored at the network device 110 is identified, and act 2116 extends this such that any mismatches are identified between an access configuration indicated in each other status message in addition to the first status message and an access configuration stored at the network device.

At 2118, the access configuration is sent by the network device (e.g. by communication interface 118) to be stored at respective vehicles devices from which any status messages originate for which a mismatch was identified at 2116. Description of similar act 1918 in method 1900 is applicable to act 2118 in method 2100. In a sense, act 2118 can be considered an extension of act 1918. That is, at 1918 the access configuration stored at the network device is sent to be stored at the first vehicle device 122a when a mismatch is identified in the first status message originating from the first vehicle device 122a; act 2118 extends this such that the access configuration is sent to be stored at any vehicle devices (e.g. 122b, 122c, and 122d) in addition to the first vehicle device 122a for which a mismatch is identified in the respective status message originating from the respective vehicle device.

With reference to FIG. 19 and method 1900, three exemplary implementations are discussed above regarding certain acts of method 1900 being optional. This discussion is also applicable to method 2100 in FIG. 21. In particular, one exemplary implementation (similar to the first exemplary implementation discussed with reference to FIG. 19) includes acts 2108, 2112, 2114, 2116, and 2118. Another exemplary implementation (similar to the second exemplary implementation discussed with reference to FIG. 19) includes acts 2112, 2114, 2116, and 2118 without act 2108. In both these exemplary implementations, sending queries at act 2112 is further optional, similar to as discussed with reference to act 1912 in method 1900 of FIG. 19. Yet another exemplary implementation (similar to the third exemplary implementation discussed with reference to FIG. 19) includes acts 2108 and 2120.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device (e.g. vehicle device 122 or network device 110) generally refers to the data information being stored at a non-transitory processor-readable storage medium of said device (e.g. non-transitory processor-readable storage mediums 116 or 126).

What is claimed is:

1. A method for managing access to a vehicle including a vehicle device, the method comprising:
   storing, by at least one non-transitory processor-readable storage medium of the vehicle device, a first authorization policy, the first authorization policy including:
     a first authentication scheme for authenticating a first access key to use the vehicle in accordance with the first authorization policy;
     an indication of at least one first vehicle operation which is permitted under the first authorization policy; and
     an indication of at least one first vehicle access requirement to perform each of the at least one first vehicle operation permitted under the first authorization policy;
   storing, by the at least one non-transitory processor-readable storage medium of the vehicle device, a second authorization policy together with the first authorization policy, the second authorization policy different from the first authorization policy, the second authorization policy including:
     a second authentication scheme for authenticating a second access key to use the vehicle in accordance with the second authorization policy;
     an indication of at least one second vehicle operation which is permitted under the second authorization policy; and
     an indication of at least one second vehicle access requirement to perform each of the at least one second vehicle operation permitted under the second authorization policy;
   receiving, by the vehicle device, a user-provided access key from a user;
   attempting to authenticate access to the vehicle under the first authorization policy, by the vehicle device, by attempting to authenticate the user-provided access key against the first access key in accordance with the first authentication scheme;
   if attempting to authenticate access to the vehicle under the first authorization policy is successful:
     receiving, by the vehicle device, a user request to perform a user-requested vehicle operation;
     determining, by the vehicle device, whether the user-requested vehicle operation is included in the at least one first vehicle operation which is permitted under the first authorization policy;
     determining, by the vehicle device, whether a respective at least one first vehicle access requirement to perform the user-requested vehicle operation is met;
     if the user-requested vehicle operation is included in the at least one first vehicle operation which is permitted under the first authorization policy, and the respective at least one first vehicle access requirement to perform the user-requested vehicle operation is met, performing the user-requested vehicle operation; and
     if the user-requested vehicle operation is not included in the at least one first vehicle operation which is permitted under the first authorization policy, or the respective at least one first vehicle access requirement to perform the user-requested vehicle operation is not met, denying the user request to perform the user-requested vehicle operation; and
   if attempting to authenticate access to the vehicle under the first authorization policy is not successful:
     denying access to the vehicle to the user under the first authorization policy.

2. The method of claim 1, further comprising, if attempting to authenticate access to the vehicle under the first authorization policy is not successful:
   attempting to authenticate access to the vehicle under the second authorization policy, by the vehicle device, by attempting to authenticate the user-provided access key to the second access key in accordance with the second authentication scheme;
   if attempting to authenticate access to the vehicle under the second authorization policy is successful:
     receiving, by the vehicle device, the user request to perform the user-requested vehicle operation;
     determining, by the vehicle device, whether the user-requested vehicle operation is included in the at least one second vehicle operation which is permitted under the second authorization policy;
     determining, by the vehicle device, whether a respective at least one second vehicle access requirement to perform the user-requested vehicle operation is met;
     if the user-requested vehicle operation is included in the at least one second vehicle operation which is permitted under the second authorization policy, and the respective at least one second vehicle access requirement to perform the user-requested vehicle operation is met, performing the user-requested vehicle operation; and
     if the user-requested vehicle operation is not included in the at least one second vehicle operation which is permitted under the second authorization policy, or the respective at least one second vehicle access requirement to perform the user-requested vehicle operation is not met, denying the user request to perform the user-requested vehicle operation; and
   if attempting to authenticate access to the vehicle under the second authorization policy is not successful:
     denying access to the vehicle to the user under the second authorization policy.

3. The method of claim 2, further comprising:
   storing, by the at least one non-transitory processor-readable storage medium of the vehicle device, at least one additional authorization policy together with the first authorization policy and the second authorization policy, the at least one additional authorization policy different from the first authorization policy and the second authorization policy, each authorization policy in the at least one additional authorization policy including:
a respective authentication scheme for authenticating a respective access key to use the vehicle in accordance with the additional authorization policy;
an indication of at least one respective vehicle operation which is permitted under the additional authorization policy; and
an indication of at least one respective vehicle access requirement to perform each of the at least one respective vehicle operation permitted under the additional authorization policy;
if attempting to authenticate access to the vehicle under the first authorization policy, and attempting to authenticate access to the vehicle under the second authorization policy, are not successful:
attempting to authenticate access to the vehicle under the at least one additional authorization policy, by the vehicle device, by attempting to authenticate the user-provided access key to the respective access key in accordance with the respective authentication scheme of the at least one additional authorization policy;
if attempting to authenticate access to the vehicle under the at least one additional authorization policy is successful:
receiving, by the vehicle device, the user request to perform the user-requested vehicle operation;
determining, by the vehicle device, whether the user-requested vehicle operation is included in the at least one respective vehicle operation which is permitted under the at least one additional authorization policy;
determining, by the vehicle device, whether a respective at least one vehicle access requirement to perform the user-requested vehicle operation is met;
if the user-requested vehicle operation is included in the at least one respective vehicle operation which is permitted under the at least one additional authorization policy, and the respective at least one vehicle access requirement to perform the user-requested vehicle operation is met, performing the user-requested vehicle operation; and
if the user-requested vehicle operation is not included in the at least one respective vehicle operation which is permitted under the at least one additional authorization policy, or the respective at least one vehicle access requirement to perform the user-requested vehicle operation is not met, denying the user request to perform the user-requested vehicle operation; and
if attempting to authenticate access to the vehicle under the at least one additional authorization policy is not successful:
denying access to the vehicle to the user under the at least one additional authorization policy.

4. The method of claim 1, further comprising:
storing, by the at least one non-transitory processor-readable storage medium of the vehicle device, at least one additional authorization policy together with the first authorization policy, the at least one additional authorization policy different from the first authorization policy, each authorization policy in the at least one additional authorization policy including:
a respective authentication scheme for authenticating a respective access key to use the vehicle in accordance with the additional authorization policy;
an indication of at least one respective vehicle operation which is permitted under the additional authorization policy; and
an indication of at least one respective vehicle access requirement to perform each of the at least one respective vehicle operation permitted under the additional authorization policy; and
prior to attempting to authenticate access to the vehicle under the first authorization policy, selecting the first authorization policy for authentication from the first authorization policy and the at least one additional authorization policy.

5. The method of claim 1, wherein the at least one first vehicle operation which is permitted under the first authorization policy includes at least one vehicle operation selected from a group of vehicle operations consisting of:
unlocking at least one door of the vehicle;
locking at least one door of the vehicle;
unlocking a service access of the vehicle;
locking a service access of the vehicle;
enabling an ignition of the vehicle;
disabling an ignition of the vehicle;
starting an engine of the vehicle;
turning off an engine of the vehicle;
enabling movement of the vehicle;
disabling movement of the vehicle;
disengaging a parking brake of the vehicle;
engaging the parking brake of the vehicle;
providing an indication of a location of the vehicle;
providing an indication of a location of a device in the vehicle;
activating at least one light of the vehicle;
activating a horn of the vehicle; and
reversing authentication of the user for the vehicle.

6. The method of claim 1, wherein the at least one first vehicle access requirement to perform each of the at least one first vehicle operation permitted under the first authorization policy includes at least one vehicle access requirement selected from a group of vehicle access requirements consisting of:
the vehicle being vacant;
the vehicle not being reserved for use by another user;
the vehicle being reserved for use by the user; and
the vehicle being operable.

7. The method of claim 1, wherein receiving a user request to perform a user-requested vehicle operation comprises: receiving an indication of an attempt by the user to perform the user-requested vehicle operation.

8. The method of claim 1, further comprising storing, by the at least one non-transitory processor-readable storage medium, an indication of at least one reservation of the vehicle.

9. The method of claim 1, further comprising storing, by the at least one non-transitory processor-readable storage medium, a reservation schedule of the vehicle.

10. The method of claim 1, further comprising: receiving, by the vehicle device, an identification of a user who provides the user-provided access key to the vehicle device.

11. The method of claim 10, further comprising:
storing, by the at least one non-transitory processor-readable storage medium, a list of at least one user who can be authenticated to access the vehicle; and
wherein attempting to authenticate access to the vehicle under the first authorization policy further comprises:

attempting to authenticate, by the vehicle device, the identification of the user to the list of at least one user who can be authenticated to access the vehicle.

12. The method of claim 11, further comprising:
sending, by at least one communication interface of the vehicle device, a status message to be received by at least one remote device remote from the vehicle, the status message indicative of at least a version of the first authorization policy or of the list of at least one user who can be authenticated to access the vehicle.

13. The method of claim 12, further comprising receiving, by the at least one communication interface of the vehicle device, an updated version of the first authorization policy or an updated list of at least one user who can be authenticated to access the vehicle after sending the status message.

14. The method of claim 12, wherein sending the status message is performed in response to receiving a query for status.

15. The method of claim 12, wherein sending the status message comprises sending the status message on a periodic basis.

* * * * *